(12) United States Patent
Schultink et al.

(10) Patent No.: US 6,183,536 B1
(45) Date of Patent: Feb. 6, 2001

(54) ENHANCED PERFORMANCE VACUUM CLEANER BAG AND METHOD OF OPERATION

(75) Inventors: Bas Schultink, Overpelt; Jan Schultink, Eksel, both of (BE)

(73) Assignee: Airflo Europe, N.V. (BE)

(*) Notice: Under 35 U.S.C. 154(b), the term of this patent shall be extended for 0 days.

(21) Appl. No.: 09/306,880

(22) Filed: May 7, 1999

Related U.S. Application Data

(60) Provisional application No. 60/085,032, filed on May 11, 1998, provisional application No. 60/096,039, filed on Aug. 11, 1998, and provisional application No. 60/106,143, filed on Oct. 29, 1998.

(51) Int. Cl.[7] ............................ B03C 3/011
(52) U.S. Cl. ................ 95/57; 15/347; 15/352; 55/382; 55/486; 55/487; 55/DIG. 2; 55/DIG. 39; 96/15; 96/69; 95/78; 95/287
(58) Field of Search ................ 95/57, 78, 286, 95/287; 96/15, 65, 66, 69; 55/382, 528, 485–487, DIG. 2, DIG. 3, DIG. 5, DIG. 39; 264/DIG. 48; 428/340, 903; 442/389; 15/347, 352

(56) References Cited

U.S. PATENT DOCUMENTS

| | | | |
|---|---|---|---|
| 3,971,373 | 7/1976 | Braun | 128/146.2 |
| 4,116,648 | 9/1978 | Bush | 55/276 |
| 4,164,400 | 8/1979 | Wald | 55/382 |

(List continued on next page.)

FOREIGN PATENT DOCUMENTS

| | | |
|---|---|---|
| 195 44 790 A1 | 6/1997 | (DE) . |
| 0 375 234 A1 | 6/1970 | (EP) . |
| 0 338 479 A1 | 10/1989 | (EP) . |
| 0 161 790 B1 | 2/1990 | (EP) . |
| 0 477 007 A1 | 3/1992 | (EP) . |
| 0 582 286 A1 | 2/1994 | (EP) . |
| 0 639 061 A1 | 5/1997 | (EP) . |
| 0 893 151 A2 | 4/1998 | (EP) . |
| 55-67314 * | 5/1980 | (JP) ........................... 55/382 |
| WO 97/30772 | 8/1997 | (WO) . |
| WO 98/11282 | 3/1998 | (WO) . |

OTHER PUBLICATIONS

American Allergy Supply–3M Filtrete Vacuum Filter Bags Internet Web Publication http://www.neosoft.com/user/s/sreifler/3mbagidx.htm Copyright 1994–1997.

Primary Examiner—Richard L. Chiesa
(74) Attorney, Agent, or Firm—Schnader Harrison Segal & Lewis, LLP

(57) ABSTRACT

A vacuum filter bag is constructed of layers which include a high air permeability multipurpose layer positioned upstream in the direction of air flow of a second filtration layer. The second filtration layer can be a wet-laid filter paper, a dry-laid filter paper or a spunbond nonwoven. The multipurpose layer can be made of high bulk meltblown nonwoven, dry-laid or wet-laid high dust holding capacity paper spunblown modular or microdenier spunbond. The high dust capacity papers are characterized by greater thickness and higher air permeability than is normally used in traditional filter layers of vacuum cleaner bag structures. These characteristics allow the high capacity papers to filter large dirt particles and to capture within their pores large amounts of dust particles. This protects the downstream second filtration layer from shock loading and enables the composite structure to pass air at high rate at low pressure differential for much longer than conventional vacuum cleaner bags. A method of filtering gas through such a filter is also disclosed.

26 Claims, 26 Drawing Sheets

U.S. PATENT DOCUMENTS

| | | | |
|---|---|---|---|
| 4,215,682 | 8/1980 | Kubik et al. | 128/205.29 |
| 4,257,791 | 3/1981 | Wald | 55/382 |
| 4,375,718 | 3/1983 | Wadsworth et al. | 29/592 E |
| 4,429,001 | 1/1984 | Kolpin et al. | 428/283 |
| 4,589,894 | 5/1986 | Gin et al. | 55/274 |
| 4,592,815 | 6/1986 | Nakao | 204/165 |
| 4,917,942 | 4/1990 | Winters | 428/286 |
| 4,948,639 | 8/1990 | Brooker et al. | 428/35.2 |
| 5,080,702 | 1/1992 | Bosses | 55/382 |
| 5,230,800 | 7/1993 | Nelson | 210/496 |
| 5,244,703 | 9/1993 | Bosses | 428/35.2 |
| 5,306,534 | 4/1994 | Bosses | 428/35.2 |
| 5,419,953 | 5/1995 | Chapman | 428/284 |
| 5,437,910 | 8/1995 | Raabe et al. | 428/194 |
| 5,647,881 | 7/1997 | Zhang et al. | 55/382 |
| 5,672,188 | 9/1997 | Choi | 55/485 |
| 5,730,923 | 3/1998 | Hassenboehler, Jr. et al. | 264/479 |
| 5,785,725 * | 7/1998 | Cusick et al. | 55/528 X |
| 6,045,595 * | 4/2000 | Freudenberg | 55/486 X |

\* cited by examiner

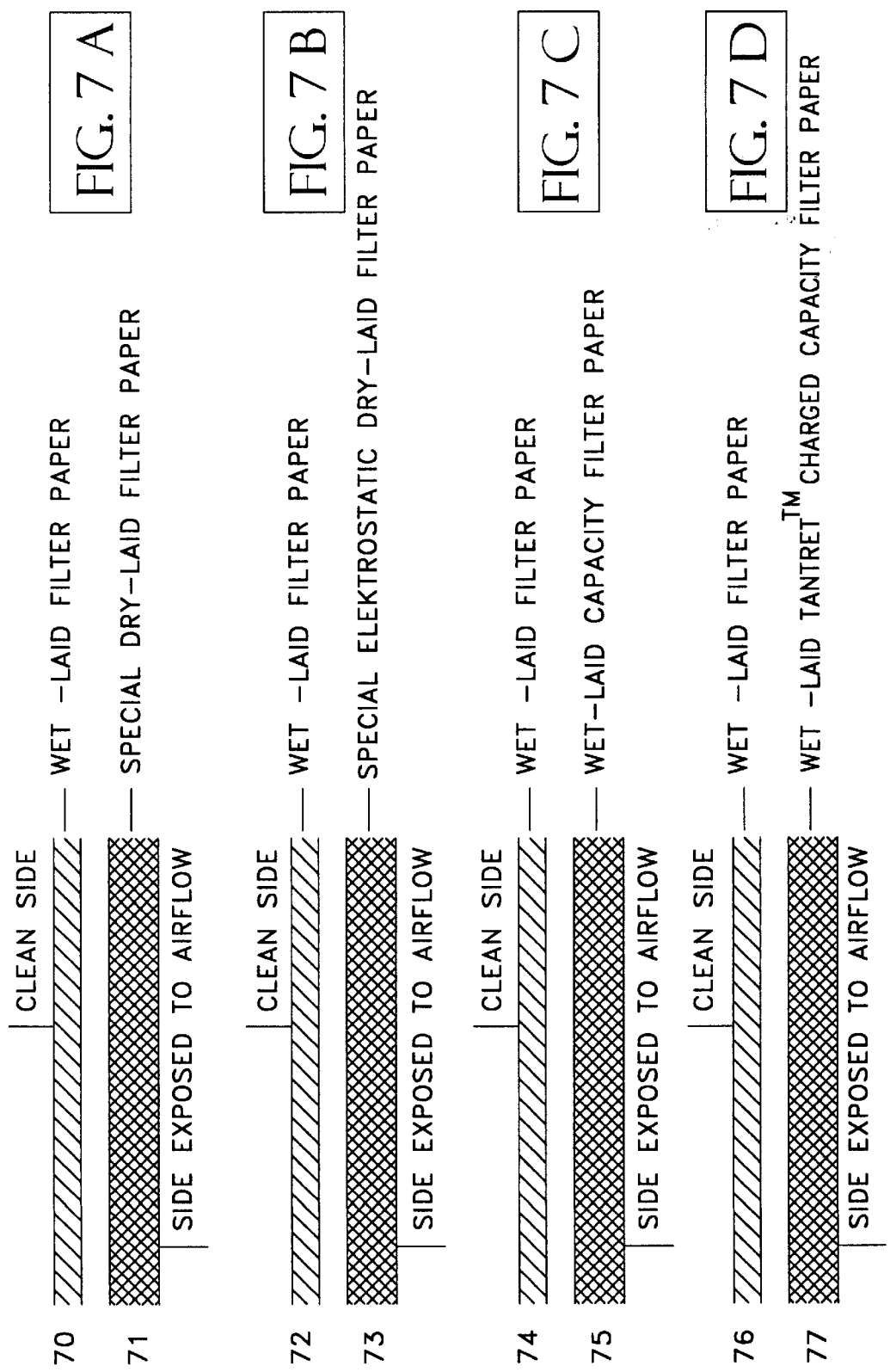

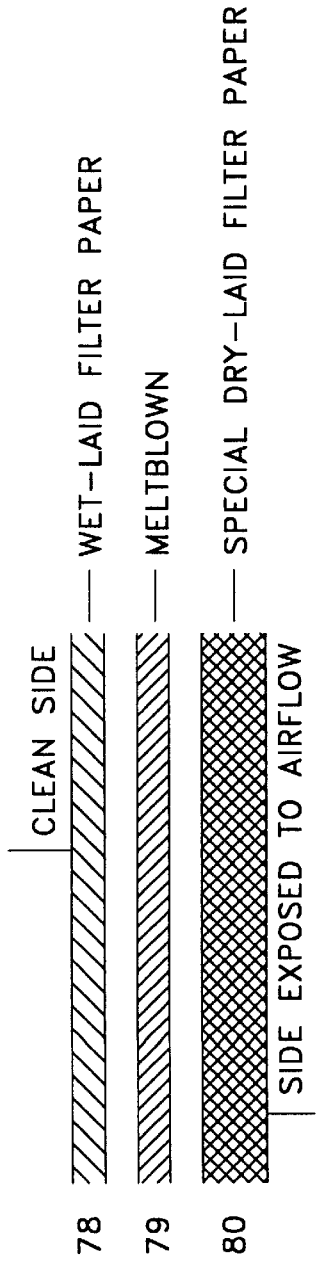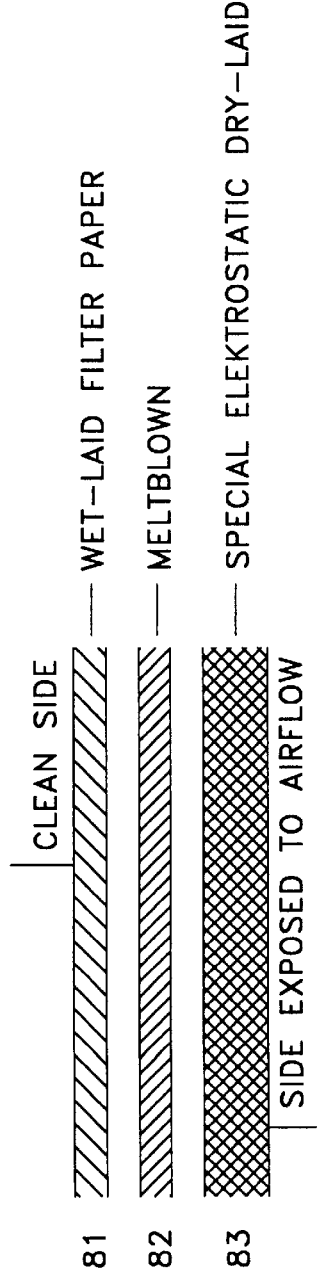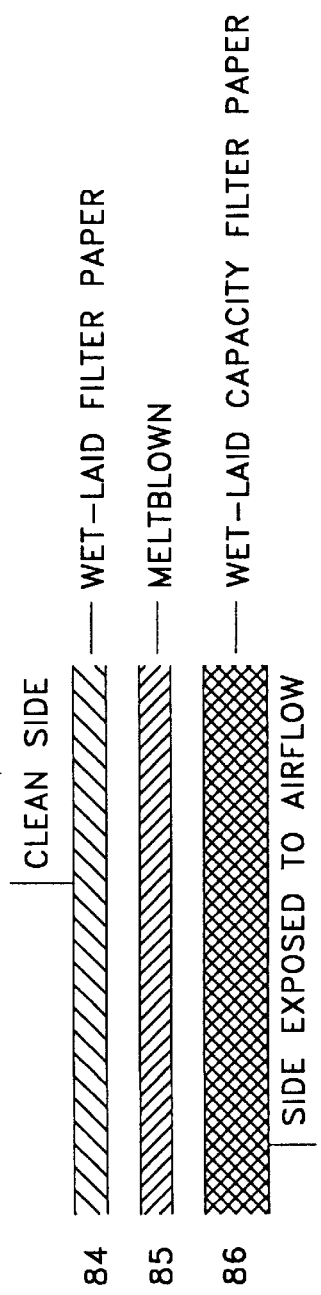

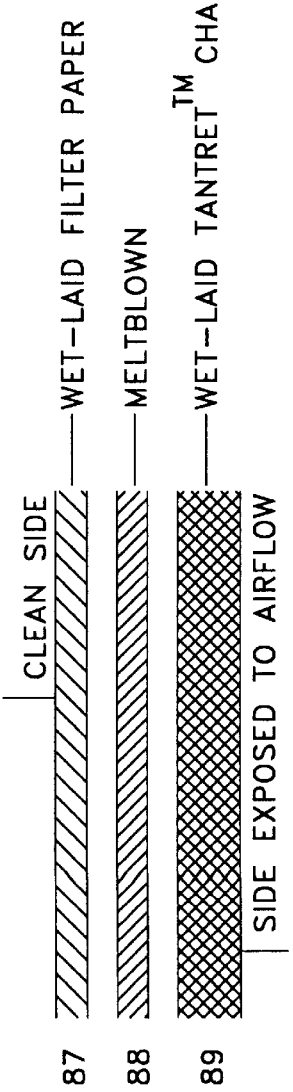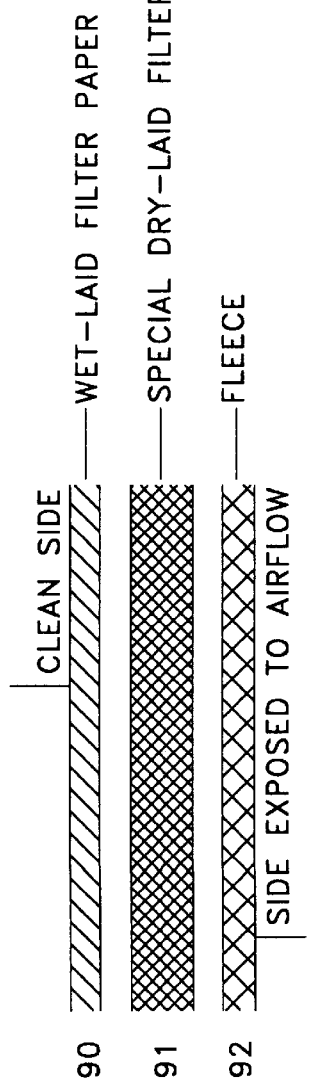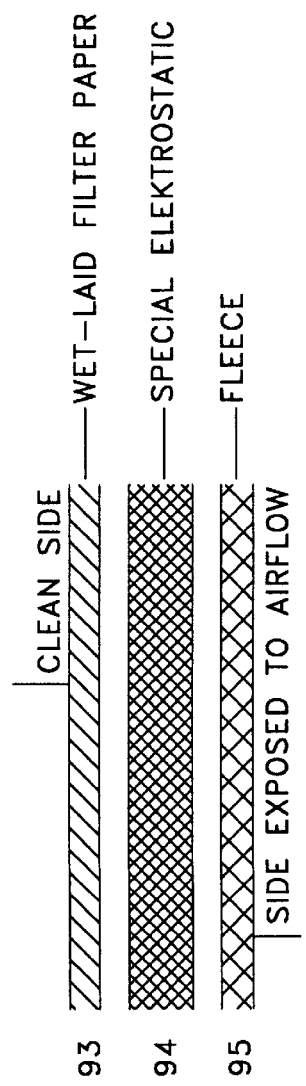

106 WET-LAID FILTER PAPER
107 MELTBLOWN
108 SPECIAL ELEKTROSTATIC DRY-LAID FILTER PAPER
109 FLEECE

110 WET-LAID FILTER PAPER
111 MELTBLOWN
112 WET-LAID CAPACITY FILTER PAPER
113 FLEECE

114 WET-LAID FILTER PAPER
115 MELTBLOWN
116 WET-LAID TANTRET™ CHARGED CAPACITY FILTER PAPER
117 FLEECE

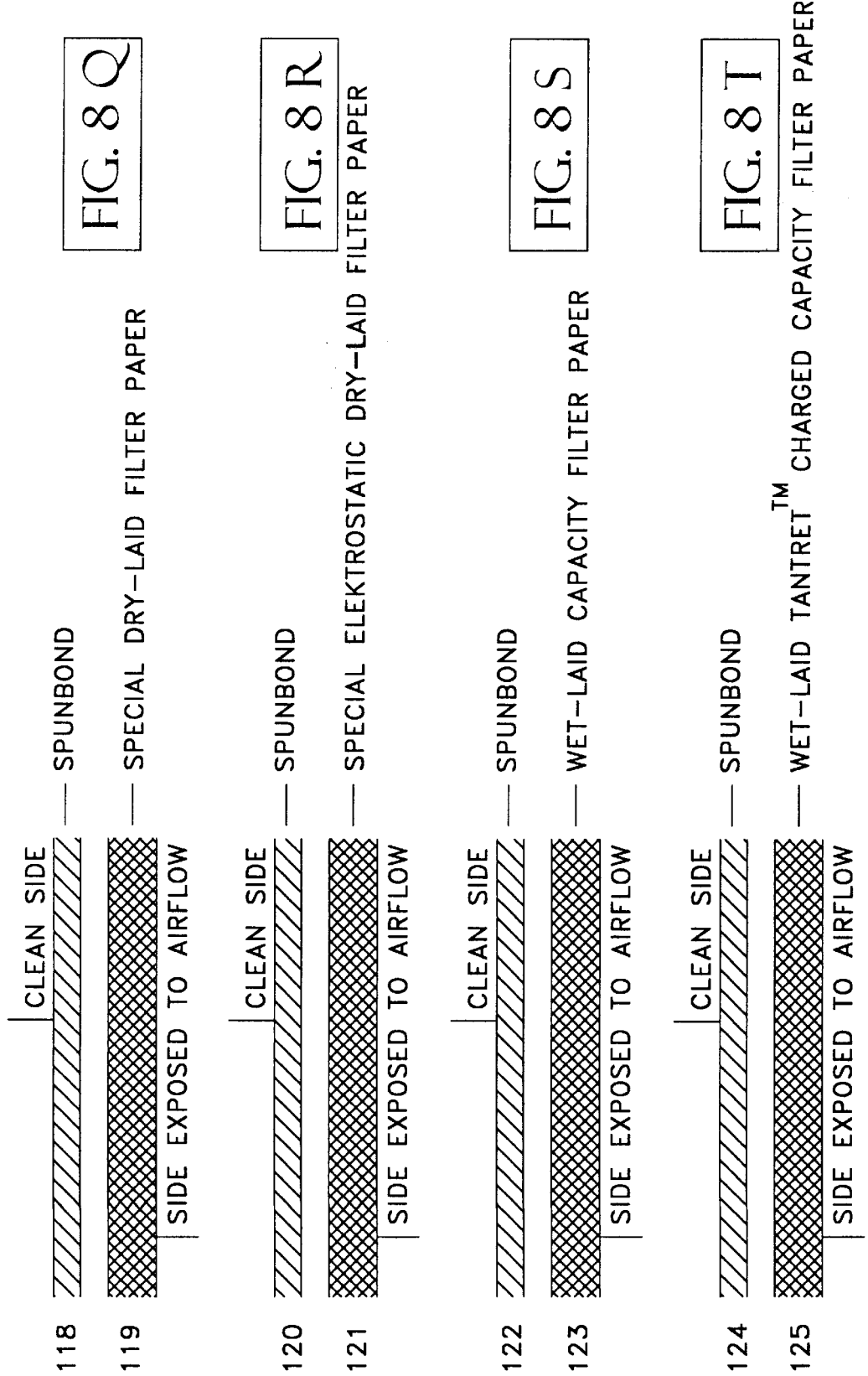

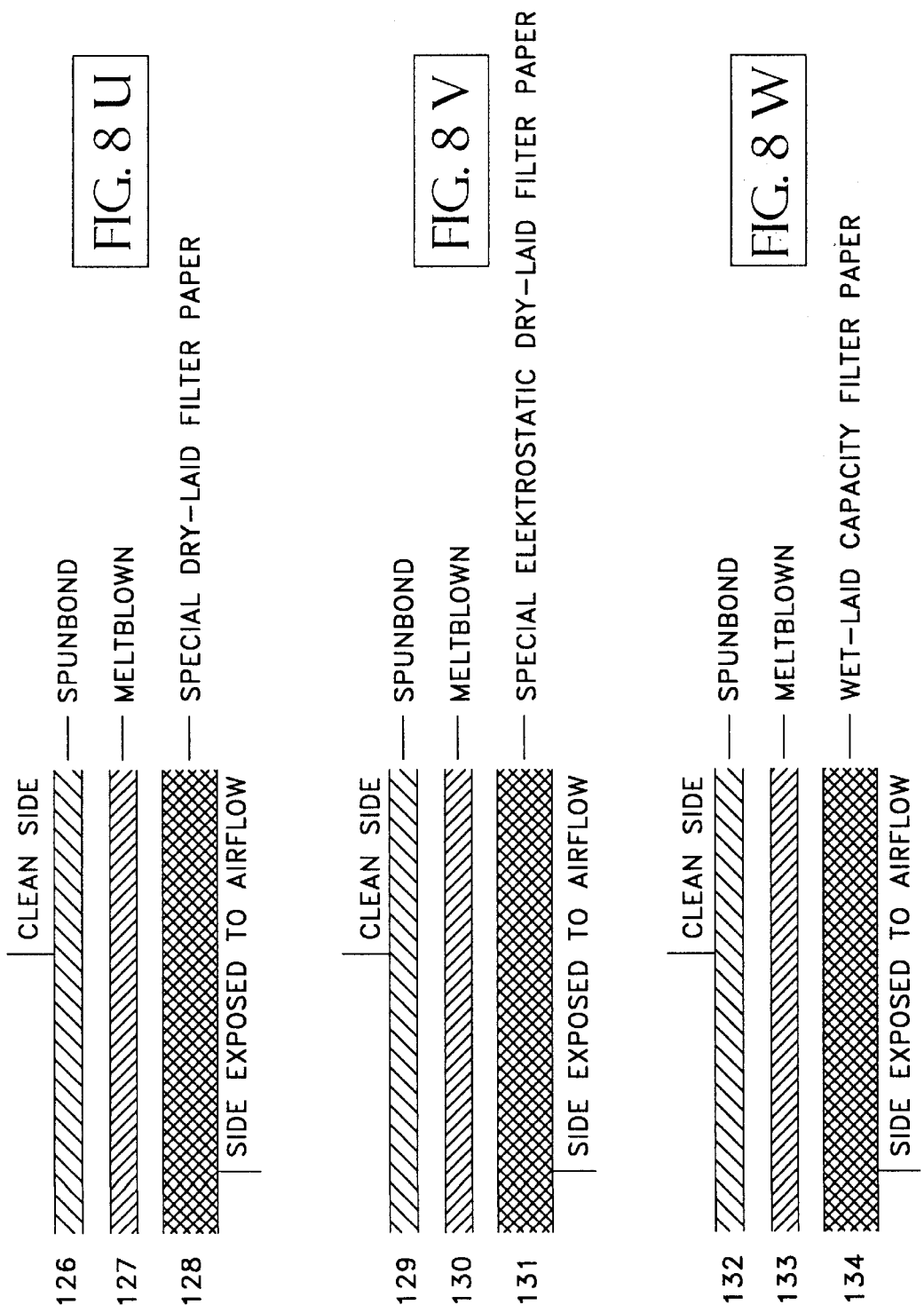

135 — SPUNBOND
136 — MELTBLOWN
137 — WET-LAID TANTRET™ CHARGED CAPACITY FILTER PAPER

CLEAN SIDE / SIDE EXPOSED TO AIRFLOW

138 — SPUNBOND
139 — SPECIAL DRY-LAID FILTER PAPER
140 — FLEECE

CLEAN SIDE / SIDE EXPOSED TO AIRFLOW

141 — SPUNBOND
142 — SPECIAL ELEKTROSTATIC DRY-LAID FILTER PAPER
143 — FLEECE

CLEAN SIDE / SIDE EXPOSED TO AIRFLOW

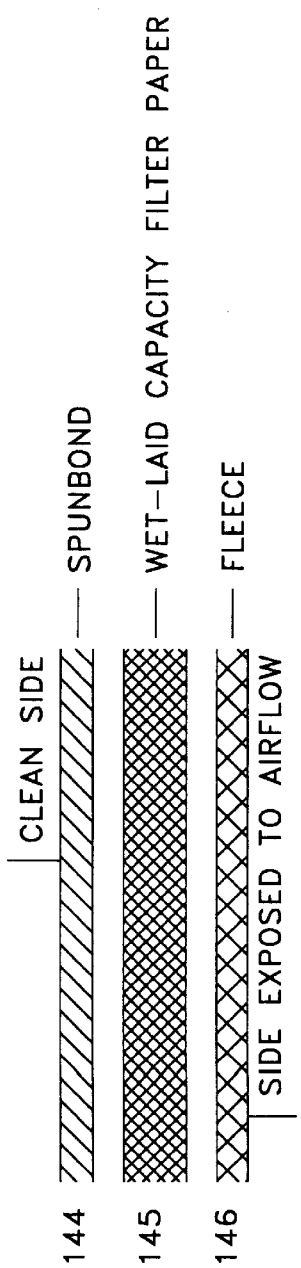
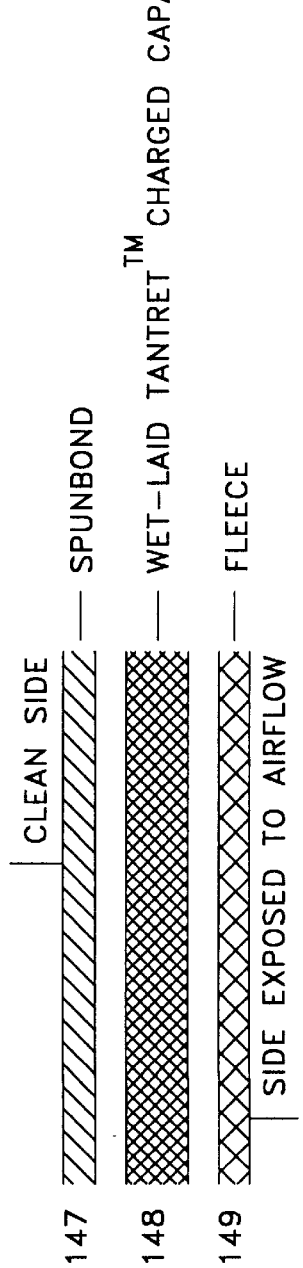
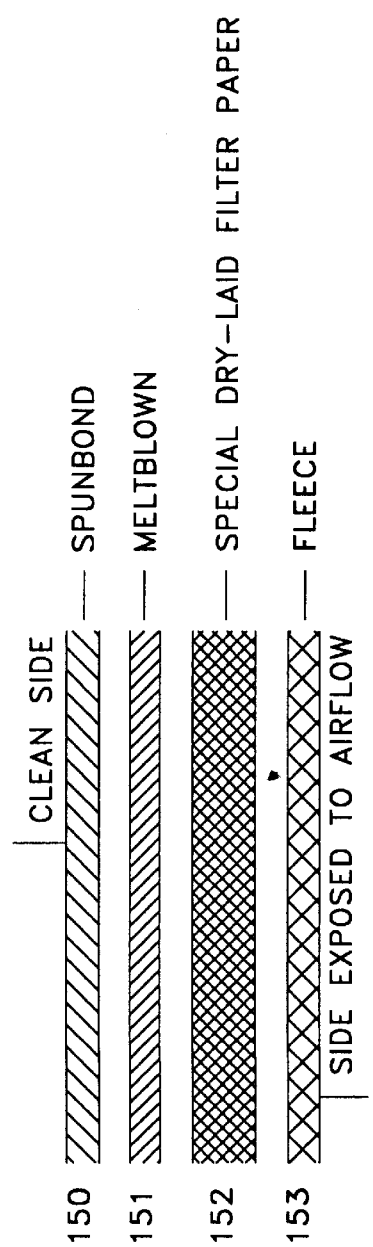

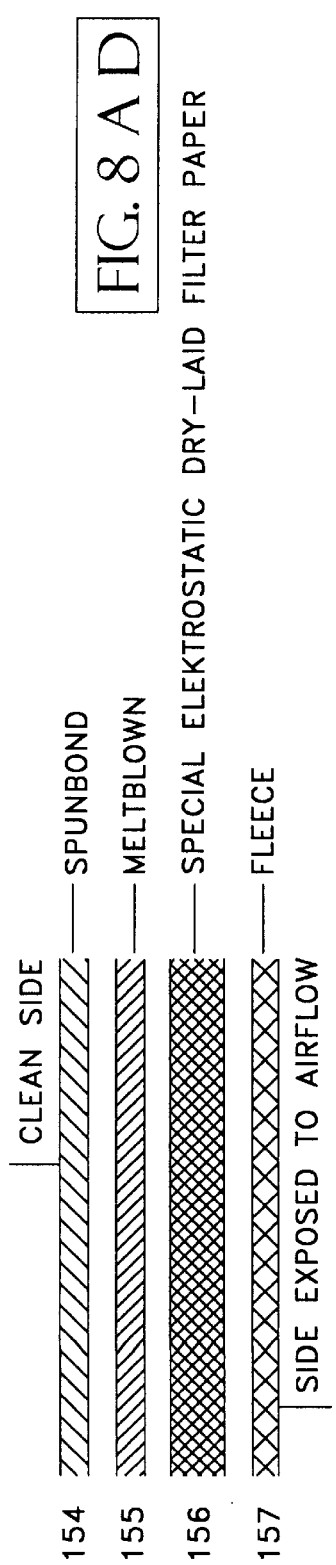
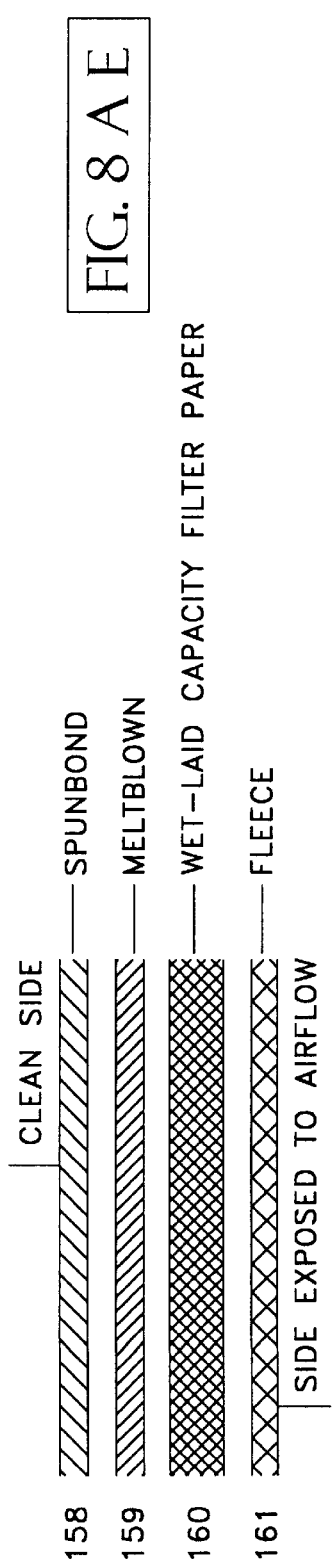
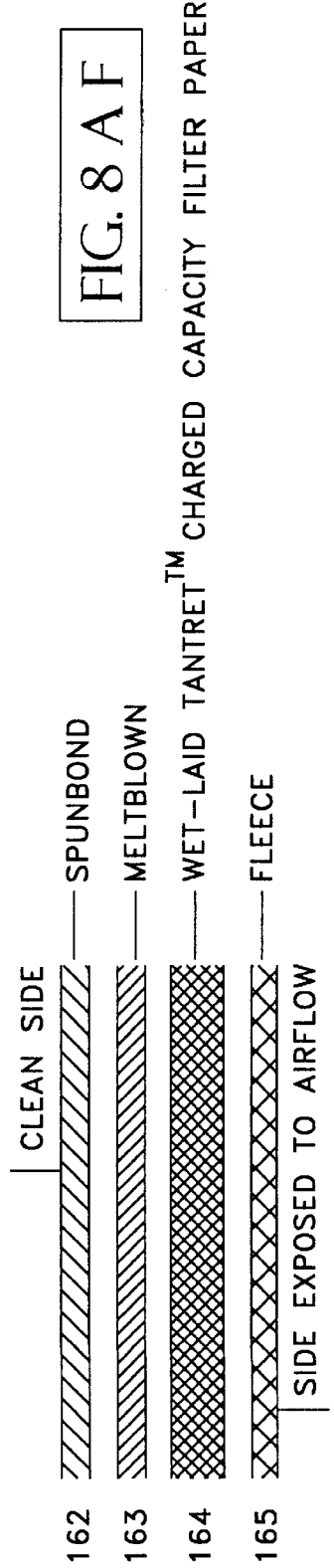

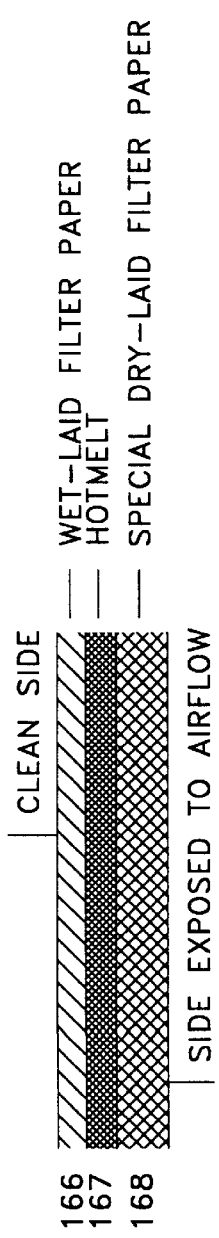
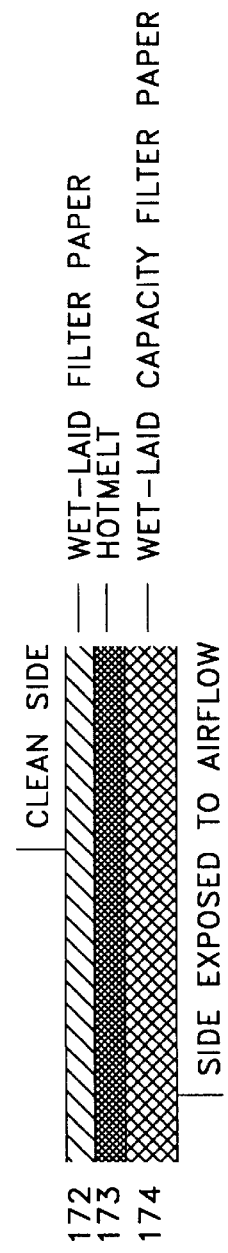
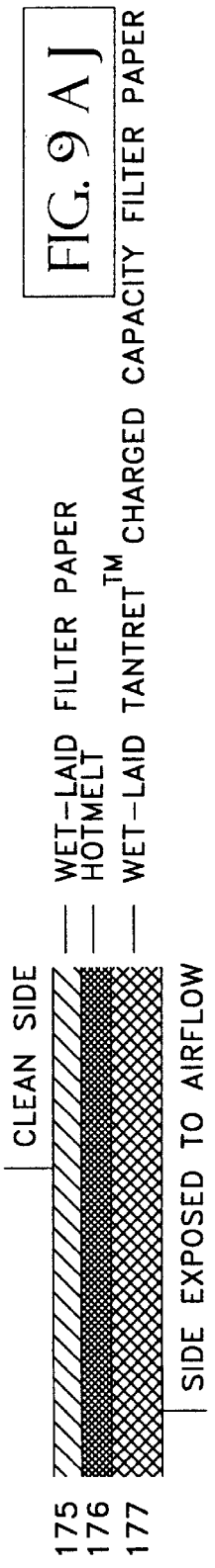

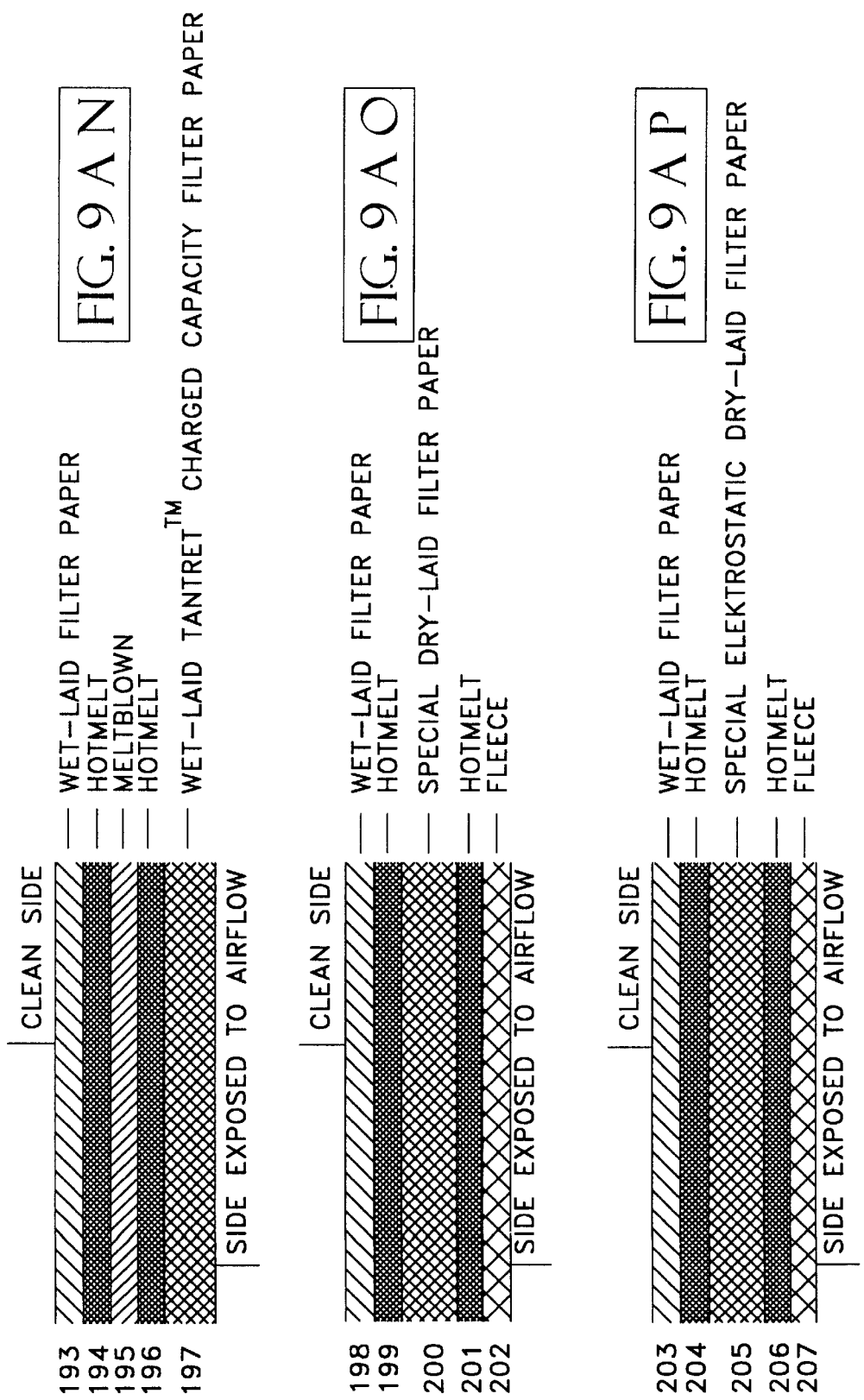

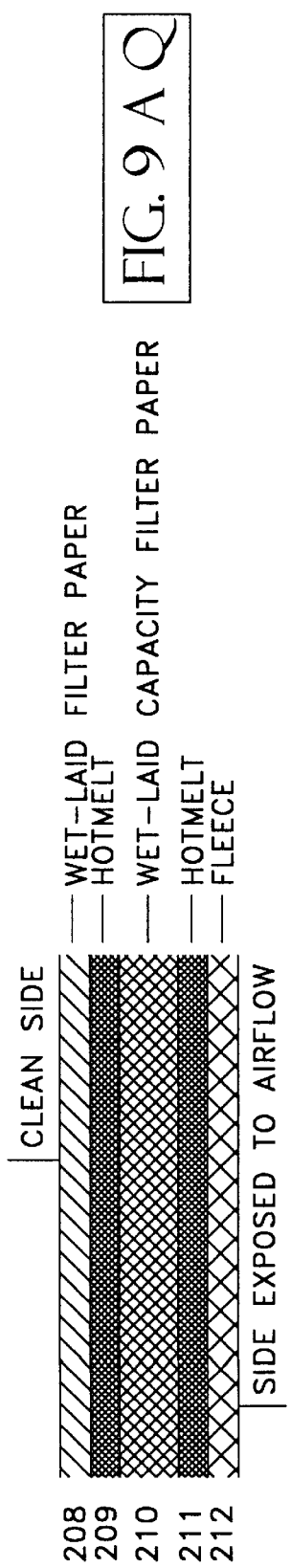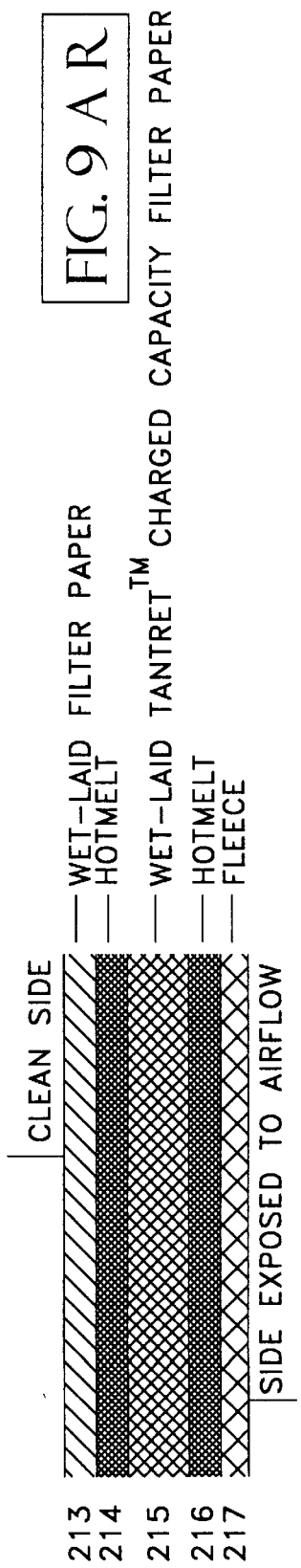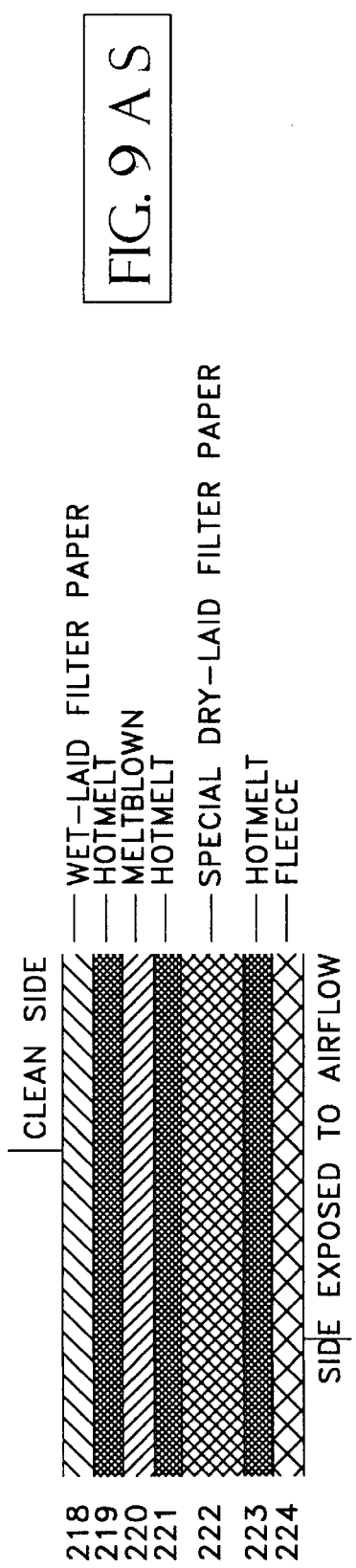

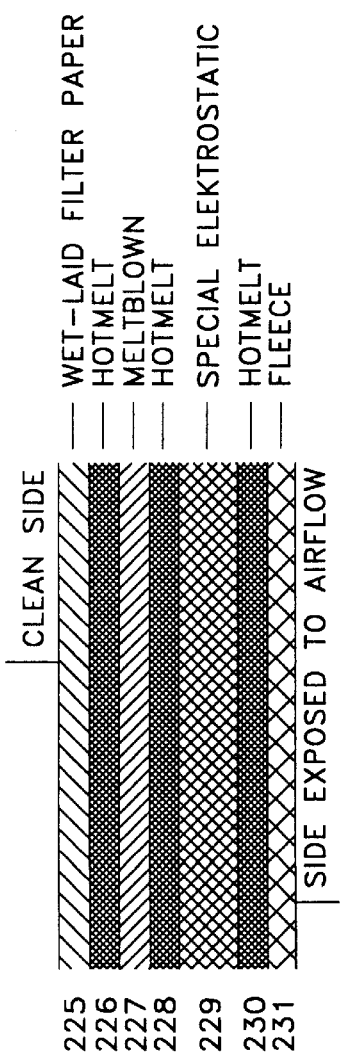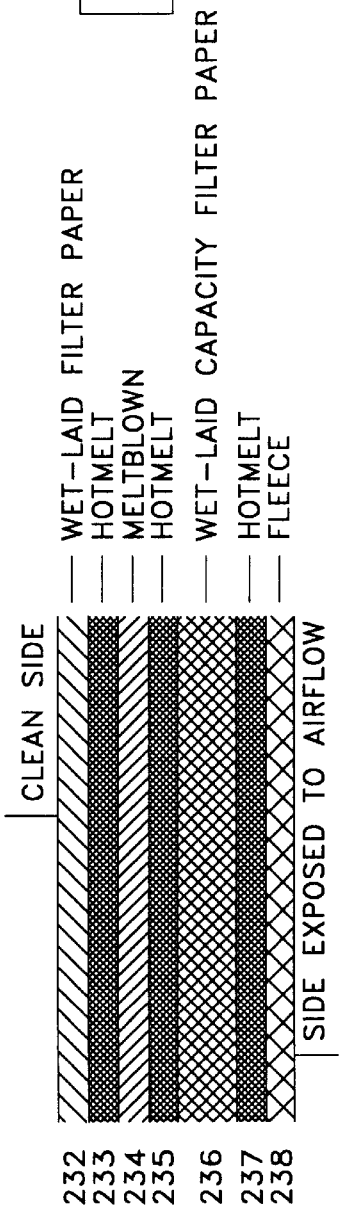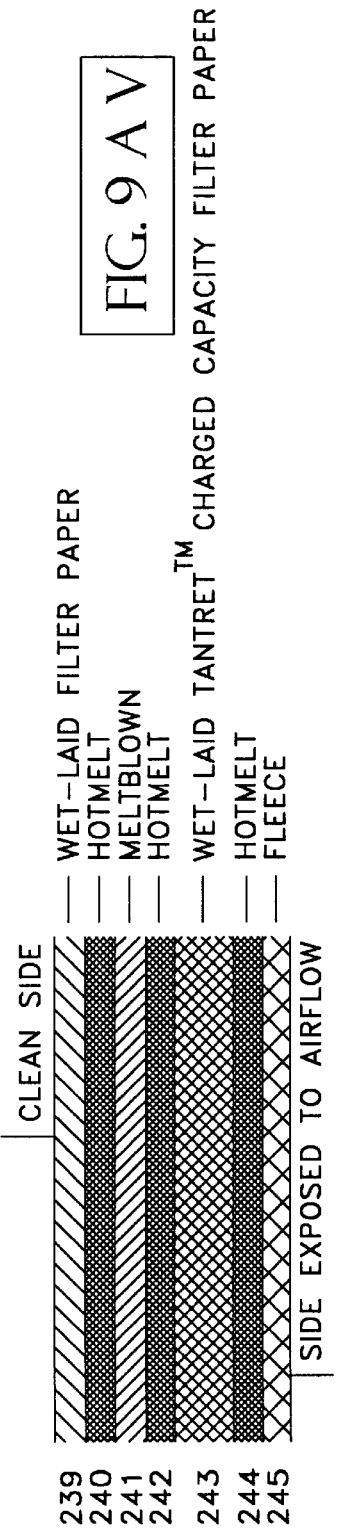

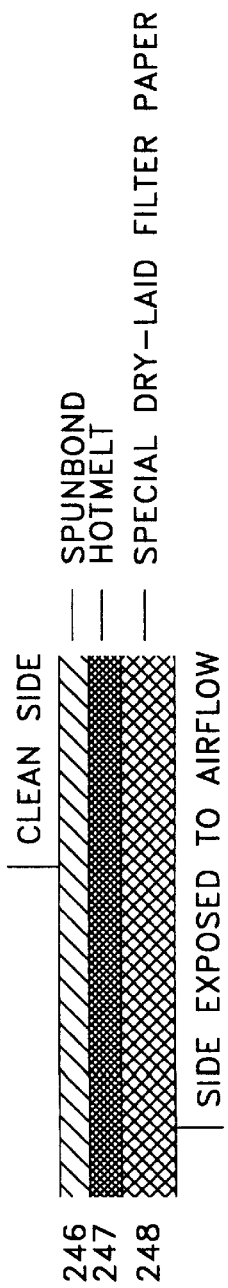
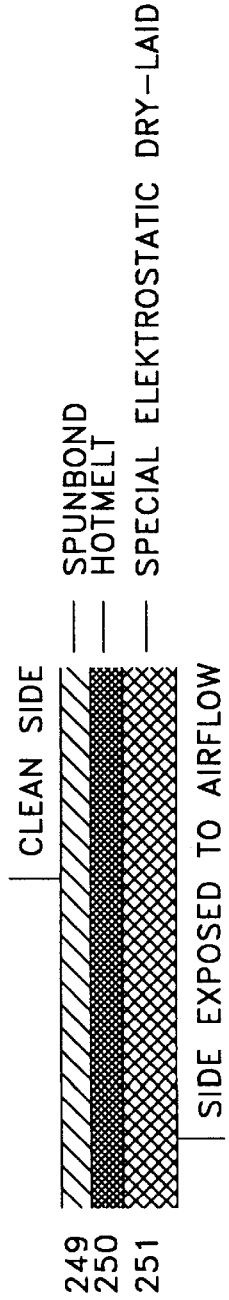
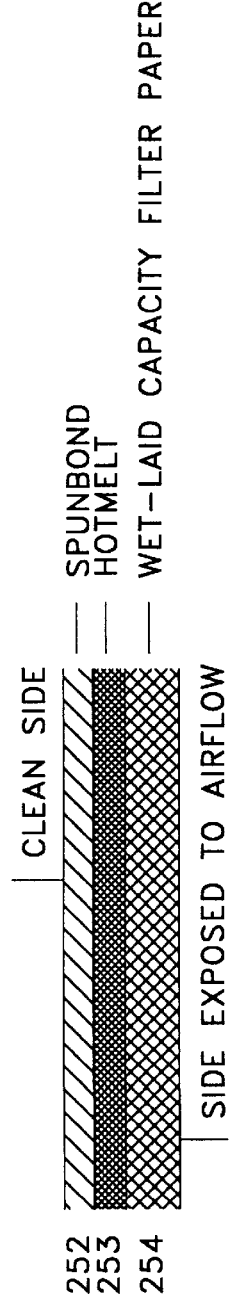
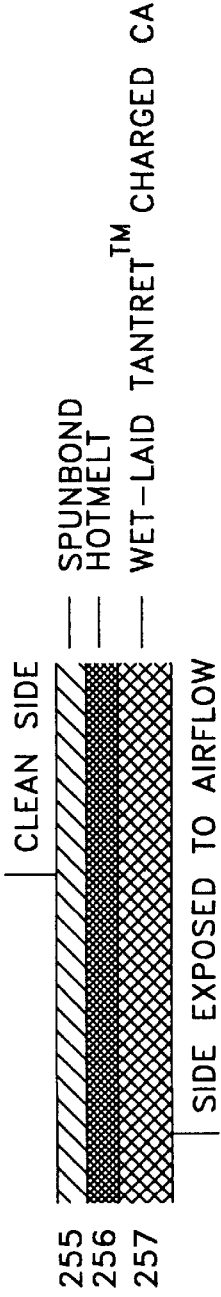

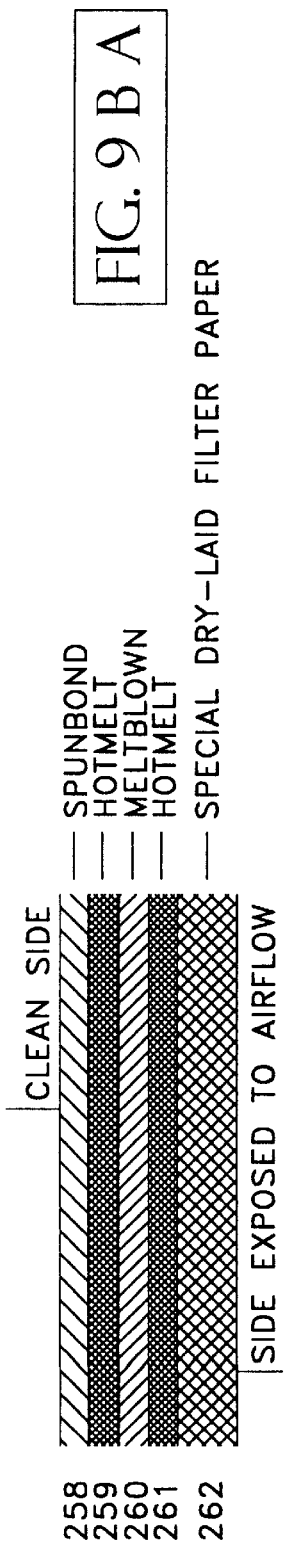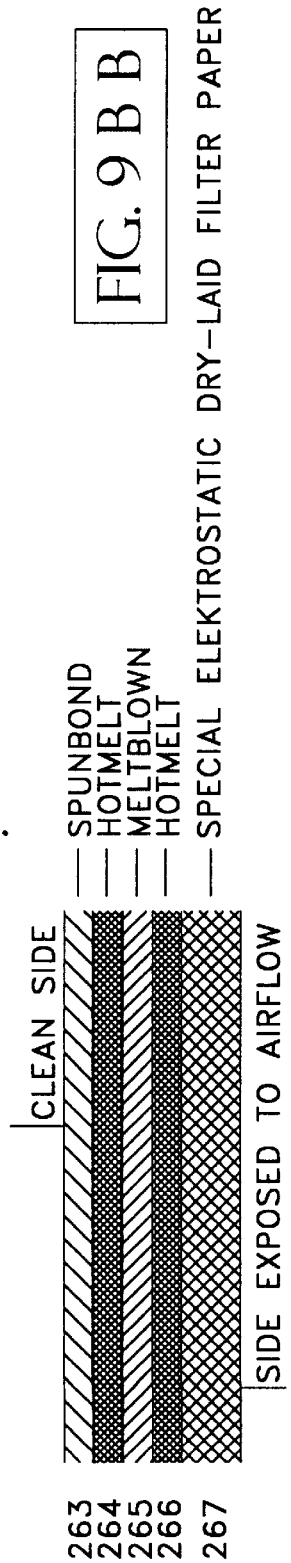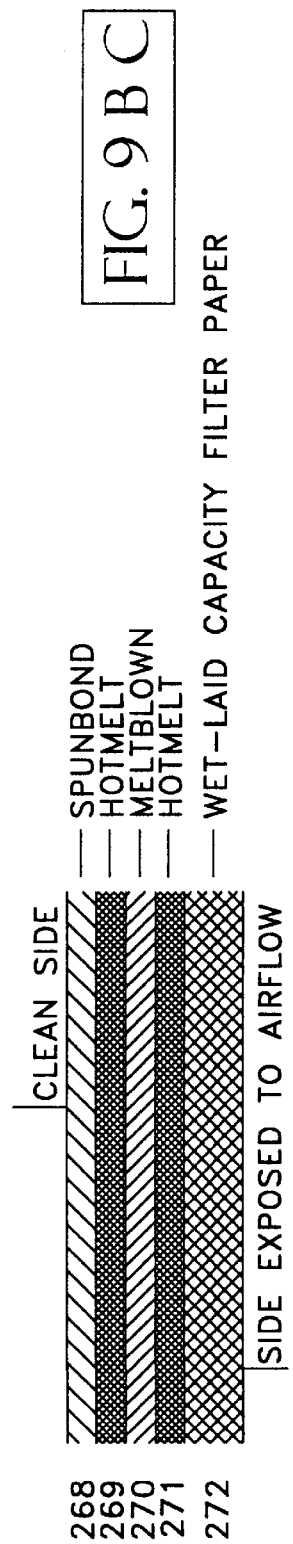

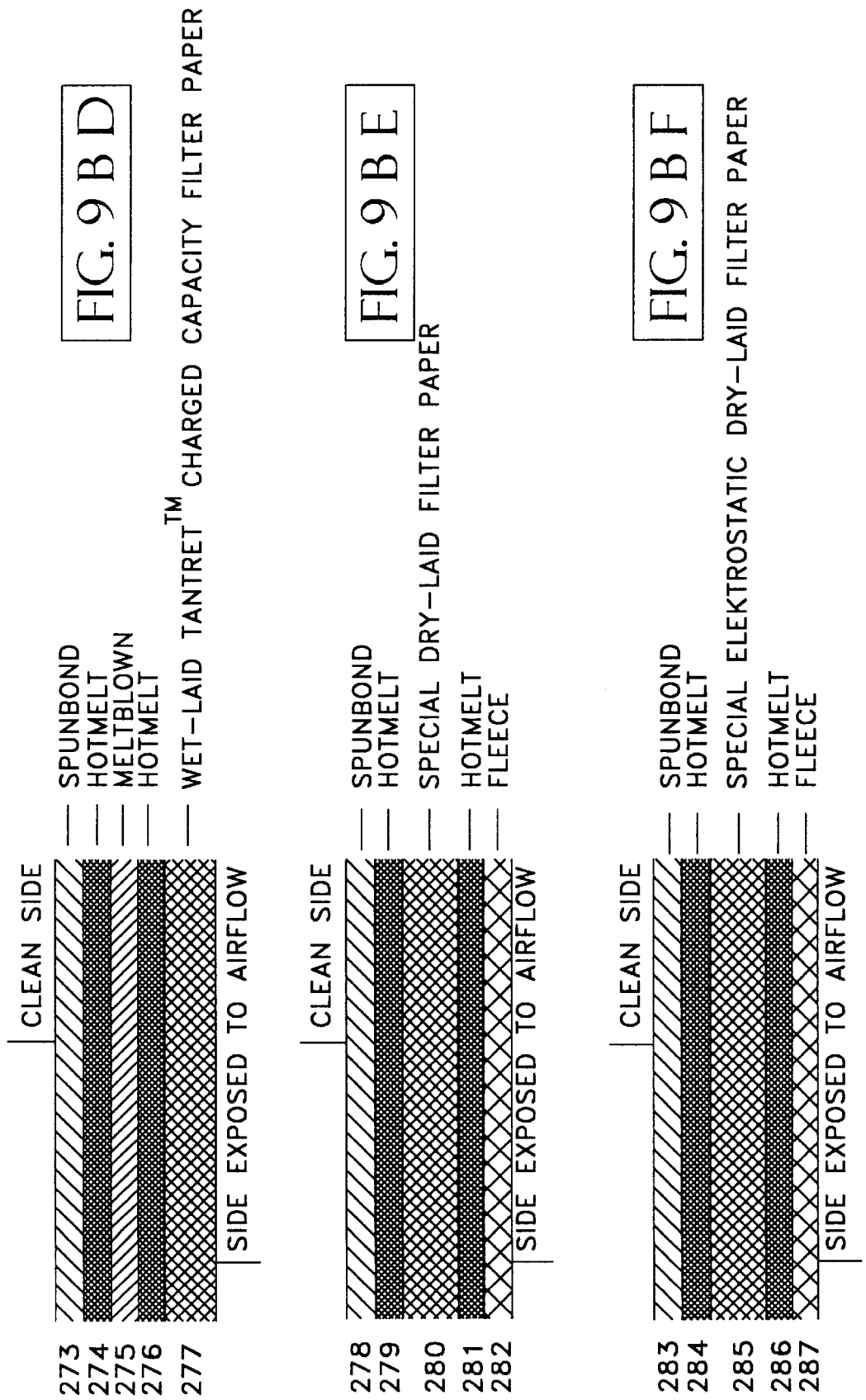

ENHANCED PERFORMANCE VACUUM CLEANER BAG AND METHOD OF OPERATION

CROSS-REFERENCE TO PRIOR APPLICATIONS

This application claims priority of Provisional Application No. 60/085,032 filed May 11, 1998, Provisional Application No. 60/096,039 filed Aug. 11, 1998, and Provisional Application No. 60/106,143 filed Oct. 29, 1998, the full disclosures of these applications are fully incorporated herein by reference.

FIELD OF THE INVENTION

This invention relates to a novel multilayer vacuum cleaner bag composite structure which is notably superior to existing vacuum cleaner bag constructions in terms of dust holding capacity, minimal increase in pressure drop with dust loading, and in ease of bag fabrication and shape retention, while achieving filtration efficiency values which compare most favorably with premium commercially available bags. More specifically, it relates to fibrous components randomly laid in three dimensions by dry-laying and wet-laying technologies to provide low density and high bulk for novel filters with greater air permeability and particulate holding capacity.

BACKGROUND OF THE INVENTION

Over the last few years, a number of companies have developed raw materials and components for vacuum cleaner bags to replace the older single layer paper bag and the well-known two-ply bag, having a downstream filter paper and an upstream tissue paper, with bags having upstream layers of either wet-laid tissues or fibrous fleeces such as meltblown (MB) ultra-fine webs occasionally referred to herein as "filtration grade MB fleece." With the advent of electrostatically charged MB fleeces, it has been possible to produce bag laminates with filtration efficiencies on the order of 99.8–99.9% to fine dust at a moderate airflow. However, conventional MB webs are essentially flat filters. Additionally, the fine dust filtering layer either is exposed directly to incoming dust particles or is positioned immediately downstream of a very open, abrasion protective tissue which only filters the largest of dust particles. Consequently, filter structures that utilize MB webs quickly load up with dust, reduce the air suction, and lose further dust pick up ability by the vacuum cleaner. Conventional dust bags generally have an air permeability of 200 to 400 L/(m$^2$×s).

Some manufacturers of vacuum cleaners have even marketed bagless vacuum cleaners to avoid the cost of bags. However, this type of vacuum cleaner has less suction and the compartment holding the dust must be emptied manually. This largely nullifies its advantages by exposing the worker and the environment to the concentrated dust. Nevertheless, the bagless cleaner has prompted manufacturers to continue to improve the overall performance of bags.

The prior art addressed the problem of providing a vacuum cleaner bag with improved filtration efficiency. U.S. Pat. No. 5,080,702, Home Care Industries, Inc. discloses a disposable filter container-like bag which comprises an assembly of juxtaposed plies, namely an inner and outer ply of air pervious material. U.S. Pat. No. 5,647,881 (EPO 0 822.775 B1) discloses a three layer composite of an outer support layer, middle charged fibrous filter layer having specific properties and an inner diffusion layer unbonded except at least at one seam to the fibrous filter layer. The diffusion layer is described to provide the filter bag as its main function, with resistance to shock loading. EPO 0 338 479 to Gessner discloses a dust filter bag with a fibrillated fleece-lined outer layer of filter paper. The filtration grade fibrillated fleece layer is upstream of the filter paper.

The disclosures of the above mentioned patents are incorporated herein in their entirety by reference.

In the vacuum bag of the invention the principal function of the inner layer is that of high dust-holding capacity, a property of this magnitude not yet disclosed in the prior art.

It is desirable to have enhanced performance vacuum cleaner bag composite structures that can yield a high efficiency of up to 99.9% and also, allow a high flow with minimal pressure gradient increase measured by the DIN 44956-2 test.

A primary object of this invention is to provide a novel vacuum cleaner bag composition capable of extremely high filtration efficiency to fine dust and of maximum performance of a vacuum cleaner in terms of continuous high suction for picking up dust without a notable increase in pressure drop until the bag is filled.

A second objective of this invention is to provide a bag with a composition such that it has the rigidity needed for it to be fabricated and shaped on conventional vacuum cleaner bag making equipment.

A third objective of this invention is to construct a vacuum cleaner bag media that by virtue of its excellent filtration efficiency and superior non-blocking, high airflow performance, will be most suitable to the new European trend of small vacuum cleaners, with of course, smaller vacuum dust bags.

These and other objectives of this inventor will become apparent to one skilled in the art from the following disclosure.

The Nonwoven Fabrics Handbook of the Association, of the Nonwoven Fabrics Inductry, 1992, is incorporated herein in its entirety by reference.

SUMMARY OF THE INVENTION

There is now provided according to this invention a composite structure for an enhanced performance vacuum cleaner bag comprising a multipurpose filtration layer occasionally referred to herein as "high dust holding capacity", "coarse", or "capacity" paper or layer positioned upstream in the direction of air flow of a second filtration layer selected from among (a) a wet-laid filter paper having a basis weight of about 30–100 g/m$^2$ and air permeability of about 100–3000 L/(m$^2$×s), and (b) a thermally bonded spunbond nonwoven having basis weight of about 10–100 g/m$^2$ and air permeability of about 500–10,000 L/(m$^2$×s), and preferably about 2,000–6,000 L/(m$^2$×s).

A preferred example is a thermally bonded dry-laid high dust capacity paper containing a blend of fluff pulp, bicomponent fibers (for thermal bonding) and electrostatically charged split film fibers. Basically, in one aspect, the novel enhanced performance vacuum cleaner bag composite structure embodies placing a wet- or dry-laid capacity paper of air permeability up to about 8,000 L/(m$^2$×s) in front of a wet-laid filter paper of air permeability up to about 3000 L/(m$^2$×s).

In another aspect, this invention provides for optional inclusion of a meltblown fleece interlayer having a basis weight of about 10–50 g/m$^2$ and an air permeability of about 100–1500 L/(m²×s) positioned between the multipurpose filtration layer and the second filtration layer. In a variation, the optional meltblown fleece interlayer can be electrostatically charged.

A scrim of typically about 13 g/m² basis weight may be placed on one or both sides of the multipurpose filtration layer/second filtration layer pair for improved abrasion resistance and ease of bag fabrication. Preferably, the scrim is positioned as the most upstream layer of the structure. Also, any or all of the layers in the novel enhanced performance bag constructions may be adhered by hot melt adhesives, glues or by thermal or ultrasonic bonding, or by a combination of these laminating methods.

A vacuum cleaner bag utilizing the enhanced performance composite structure of this invention has been found to have filtration efficiency performance favorably comparable to other vacuum cleaner bag structures. The enhanced performance structures generally have better than a 95% efficiency to the DIN 44956-2 test and can typically undergo two to three times as many DIN dust loading cycles as comparable bag constructions. They also have up to five times the DIN loading cycles as conventional bag constructions characterized either by a scrim in front of standard wet-laid paper or by a MB filter fleece in front of a standard wet-laid paper. With the optional electrostatically charged MB interlayer the new constructions have superior high fine dust filtration efficiency to 0.1–0.3 µm NaCl particles.

High filtration grade fleeces such as electrostatically charged MB, spunbond modular and microdenier spunbond media may also be incorporated into the new constructions of this invention.

DETAILED DESCRIPTION

Figure 1:
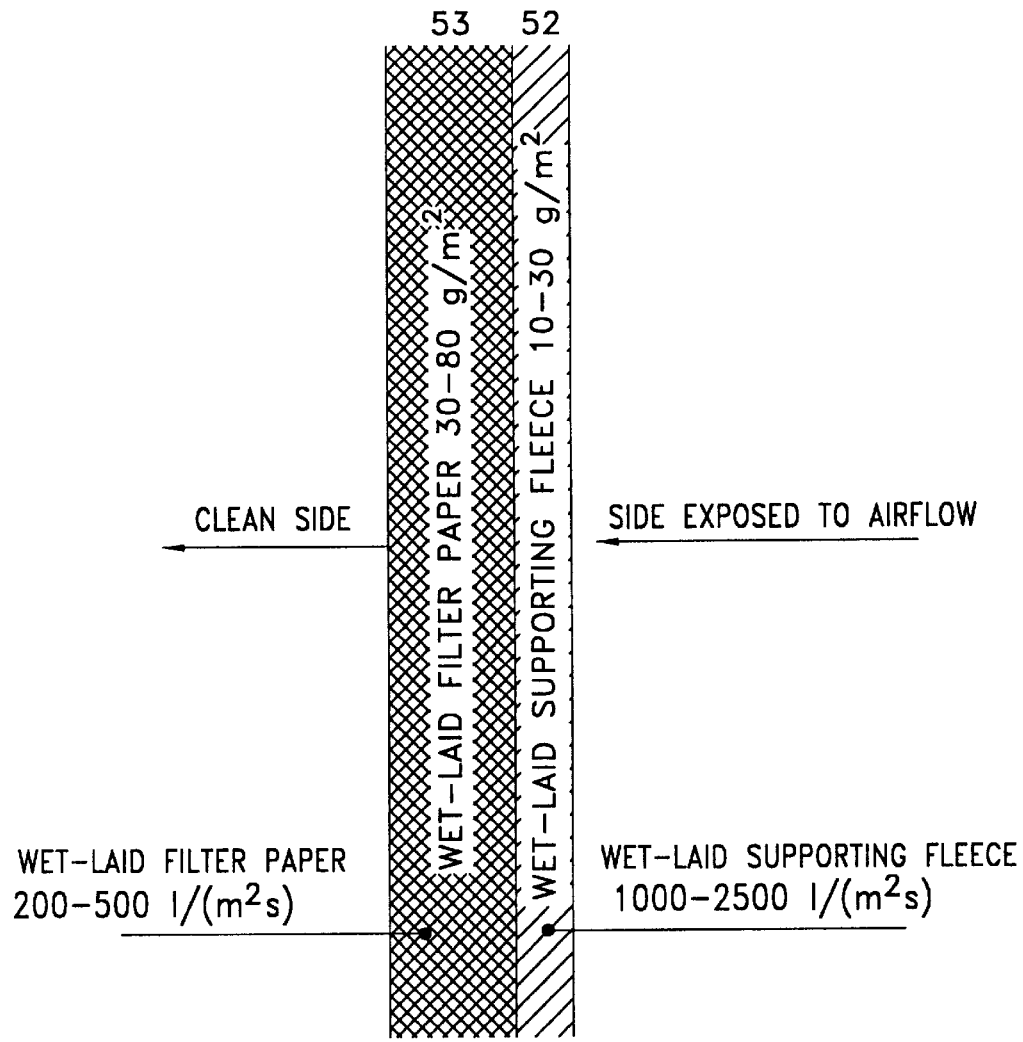
FIG. 1 is a schematic cross section of a traditional vacuum cleaner bag construction.

The filter structures of this invention apply to vacuum cleaner bags, and more generally to vacuum filters. By "vacuum filter" is meant a filter structure intended to operate by passing a gas, preferably air, which entrains usually dry solid particles, through the structure. The convention has been adopted in this application to refer to the sides and layers of the structure in relation to the direction of air flow. That is, the filter inlet side is "upstream" and the filter discharge side is "downstream" for example. Occasionally herein the terms "in front of" and "behind" have been used to denote relative positions of structure layers as being upstream and downstream respectively. Of course, there will be a pressure gradient, sometimes referred to as "pressure drop", across the filter during filtration. Vacuum cleaners typically use bag shaped filters. Normally, the upstream side of a vacuum bag filter is the inside and the downstream side is outside.

Types of papers which are referred to in this patent application are described in greater detail as follows:
Standard Vacuum Cleaner Filter Bag Paper This type of paper has traditionally been used as a single ply in which it provides dust filtration and containment, as well as the strength and abrasion resistance required of a vacuum cleaner bag. This paper is also rigid enough to enable easy fabrication on standard bag manufacturing equipment. The paper is predominantly composed of unbleached wood pulp with 6–7% of a synthetic fiber such as poly[ethylene terephthalate] (PET) type polyester, and is produced by the wet laying process. The standard paper typically has a basis weight of about 30–80 g/m² and commonly about 50 g/m². The PET fibers typically have a fineness of 1.7 dtex and lengths of 6–10 mm. This paper has air permeability of in the range of about 200–500 L/(m²×s) and an average pore size of 30 mm. However, the efficiency as determined from the DIN 44956-2 Test is only about 86%. Another disadvantage is that the pores are quickly clogged with dust and the dust holding capacity is further limited by the very thin paper thickness of only about 0.20 mm.
Spunbond Nonwoven A nonwoven of spunbond polymer fibers can be deployed as the second filtration layer or as an additional layer in the composite layer. The fibers can be of any spunbond-capable polymer such as polyamides, polyesters or polyolefins. Basis weight of the spunbond nonwoven should be about 10–100 g/m² and preferably about 30–40 g/m². The spunbond nonwoven should have an air permeability of about 500–10,000 L/(m²×s), and preferably about 2,000–6,000 L/(m²×s) as measured by DIN 53887. The spunbond can be electrostatically charged.
Scrim or Supporting Fleece Scrim refers to a generally light basis weight, very open porous paper or nonwoven web. Basis weight of the scrim is typically about 10–30 g/m², and frequently about 13–17 g/m². The scrim, sometimes referred to as a supporting fleece usually has air permeability of about 5,000–10,000 L/(m²×s). It is primarily employed to protect the high dust capacity multipurpose layer from abrasion. The scrim can also filter the very largest particles. The scrim material can be electrostatically charged if it has suitable dielectric properties.
Wet-laid High Dust Capacity Paper Wet-laid High Dust Capacity Paper, frequently referred to herein as "wet-laid capacity paper" is bulkier, thicker and more permeable than the standard vacuum cleaner bag filter paper. In its role as a pre-filter in the novel enhanced performance vacuum cleaner bag composite it performs multiple functions. These include resisting shock loading, filtering of large dirt particles, filtering a significant portion of small dust particles, holding large amounts of particles while allowing air to flow through easily, thereby providing a low pressure drop at high particle loading which extends the life of the vacuum cleaner bag.

The wet-laid capacity paper usually comprises a fiber mixture of wood pulp fibers and synthetic fibers. It typically contains up to about 70% wood pulp and correspondingly more synthetic fiber, such as PET, than the standard paper described above. It has a greater thickness than the standard paper of about 0.32 mm at a typical basis weight of 50 g/m². Pore size also is much greater, in that the average pore size can be greater than 160 μm. Thus, the paper is able to hold much more dust in its pores before clogging up. Basis weight of the wet-laid capacity paper typically is about 30–150 g/m² and preferably about 50–80 g/m².

The wet-laid capacity paper has a fine dust particle filtration efficiency of about 66–67% as determined by the DIN 44956-2. Importantly, the wet-laid capacity paper has air permeability higher than the standard filter paper. The permeability lower limit thus preferably should be at least about 500 L/(m²×s). The upper limit of permeability is defined to assure that the paper filters and holds a major fraction of the dust particles larger than about 10 μm. Consequently, the downstream high efficiency second filter medium is able to filter out and contain fine particles much longer before showing indication of a substantial pressure drop increase across the filter. Accordingly, the air permeability of the wet-laid capacity paper preferably should be at most about 8,000 L/(m²×s), more preferably at most about 5,000 L/(m²×s), and most preferably at most about 4,000 L/(m²×s). It is thus seen that the wet-laid capacity paper is especially well designed as a multipurpose filtration layer to be positioned upstream of the second filtration layer.

Dry-laid High Dust Capacity Paper

Prior to this invention, dry-laid high dust capacity paper, sometimes referred to herein as "dry-laid capacity paper", had not been used as a filter in vacuum cleaner bags. Dry-laid paper is not formed from a water slurry, but is produced with air laying technology and preferability by a fluff pulp process. Hydrogen-bonding which plays a large roll in attracting the molecular chains together does not operate in the absence of water. Thus, at the same basis weight, dry-laid capacity paper, is usually much thicker than standard paper and the wet-laid capacity paper. For a typical weight of 70 g/m², the thickness is 0.90 mm, for example.

The dry-laid capacity paper webs can be bonded primarily by two methods. The first method is latex bonding in which the latex binder may be applied from water-based dispersions. Saturation techniques such as spraying or dipping and squeezing (padder roll application) followed in both cases by a drying and heat curing process can be used. The latex binder may also be applied in discrete patterns such as dots diamonds, cross hatches or wavy lines by gravure roll followed by drying and curing. The second method is thermal bonding, for example by utilizing binder fibers. Binder fibers are defined by the *Nonwoven Fabric Handbook*, (1992 edition) as "Fibers with lower softening points than other fibers in the web. Upon the application of heat and pressure, these act as an adhesive." These thermally bondable fusing fibers generally completely melt at locations where sufficient heat and pressure are applied for the web, thereby adhering the matrix fibers together at their cross-over points. Examples include co-polyester polymers which when heated adhere a wide range of fibrous materials.

In a preferred embodiment thermal bonding can be accomplished by preferably adding at least 20% up to preferably 50% of a bicomponent ("B/C") polymer fiber to the dry-laid web. Examples of B/C fibers include fibers with a core of polypropylene ("PP") and a sheath of more heat sensitive polyethylene ("PE"). The term "heat sensitive" means that thermoplastic fibers soften and become sticky or heat fusible at a temperature of 3–5 degrees C. below the melting point and the core polymer should have a higher melting point, preferably by at least 5° C. higher, than that of the sheath polymer. For example, PE melts at 121° C. and PP melts at 161–163° C. This aids in bonding the dry-laid web when it passes between the nip of a thermal calender or into a through-air oven by achieving thermally bonded fibers with less heat and pressure to produce a less compacted, more open and breathable structure. In a more preferred embodiment the core of the core/sheath of the B/C fiber is located eccentric of the sheath. The more that the core is located towards one side of the fiber the more likely that the B/C fiber will crimp during the thermal bonding step, and thereby increase the bulk of the dry-laid capacity. This will, of course, improve its dust holding capacity. Thus, in a still further preferred embodiment the core and sheath are located side-by-side in the B/C fiber, and bonding is achieved with a through-air oven. A thermal calender, which would compress the web more than through-air bonding and is less preferred in this case. Other polymer combinations that may be used in core/sheath or side-by-side B/C fibers include PP with co-polyester low melting polymers, and polyester with nylon 6. The dry-laid capacity layer can also be constituted essentially completed by B/C fiber.

Generally, the average pore size of dry-laid capacity is intermediate between the pore size of the standard paper and wet-laid capacity paper The filtration efficiency as determined by the DIN 44956-2 Test is approximately 80%. Dry-laid capacity paper should have the same permeability as the wet-laid capacity paper described above, i.e., in the range of about 500–8000 L/(m²×s), preferably about 1000–5000 L/(m²×s) and most preferably about 2000–4000 L/(m²×s). It has excellent dust holding capacity and has the advantage of being much more uniform in weight and thickness than the wet-laid papers.

Several preferred embodiments of dry-laid capacity paper are contemplated. One is a latex bonded fluff pulp fiber composition. That is, the fibers comprising the paper consist essentially of fluff pulp. The term "fluff pulp" means a nonwoven component of the vacuum cleaner bag and especially the enhanced performance bag of this invention which is prepared by mechanically grinding rolls of pulp, i.e., fibrous material of wood, then aerodynamically transporting the pulp to web forming components of air laying or dry forming machines. A Wiley Mill can be used to grind the pulp. So-called Dan Web or M and J machines are useful for dry forming. A fluff pulp component and the dry-laid layers of fluff pulp are isotropic and are thus characterized by random fiber orientation in the direction of all three orthogonal dimensions. That is, they have a large portion of fibers oriented away from the plane of the nonwoven web, and particularly perpendicular to the plane, as compared to three-dimensionally anisotropic nonwoven webs. The fibers are held together by a latex binder. The binder can be applied either as powder or emulsion. Binder is usually present in the dry-laid capacity paper in the range of about 10–30 wt % and preferably about 20–30 wt % binder solids based on weight of fibers.

Another preferred embodiment the dry-laid capacity paper comprises a thermally bonded blend of fluff pulp fibers and at least one of split film fibers and bicomponent polymer fibers. More preferably, the blend of fluff pulp fibers comprises fluff pulp fibers and bicomponent polymer fibers.

Split film fibers are essentially flat, rectangular fibers which may be electrostatically charged before or after being incorporated into the composite structure of the invention. The thickness of the split film fibers may range from 2–100 micrometers, the width may range from 5 millimeters to 2 millimeters, and the length may range from 0.5 to 15 millimeters. However, the preferred dimensions of the split film fibers are a thickness of about 5 to 20 $\mu$m, a width of about 15 to 60 $\mu$m, and a length of about 0.5 to 3 mm.

The split film fibers of the invention are preferably made of a polyolefin, such as polypropylene (PP). However, any polymer which is suitable for making fibers may be used for the split film fibers of the composite structures of the invention. Examples of suitable polymers include, but are not limited to, polyolefins like homopolymers and copolymers of polyethylene, polyterephthalates, such as poly (ethylene terephthalate) (PET), poly(butylene terephthalate) (PBT), poly(cyclohexyl-dimethylene terephthalate) (PCT), polycarbonate, and polychlorotrifluoroethylene (PCTFE). Other suitable polymers include nylons, polyamides, polystyrenes, poly-4-methylpentene-1, polymethylmethacrylates, polyurethanes, silicones, polyphenylene sulfides. The split film fibers may also comprise a mixture of homopolymers or copolymers. In the present application, the invention is exemplified with split film fibers made of polypropylene.

The use of PP polymers with various molecular weights and morphologies in laminate film structures has been shown to produce films with a proper balance of mechanical properties and brittleness required to produce split film fibers. These PP split film fibers may also be subsequently given the desired level of crimp. All dimensions of the split film fibers may, of course, be varied during manufacture of the fibers.

One method for production of the split fibers, is disclosed in U.S. Pat. No. 4,178,157, which is incorporated by reference. Polypropylene is melted and extruded into a film which is then blown into a large tube (balloon) into which ambient air is introduced or allowed to enter, in accordance with conventional blow stretching technology. Inflating the balloon with air serves to quench the film and to bi-axially orient the molecular structure of the PP molecular chains, resulting in greater strength. The balloon is then collapsed and the film is stretched between two or more pairs of rollers in which the film is held in the nip of two contacting rollers, with the application of varying amounts of pressure between the two contacting rollers. This results in an additional stretch in the machine direction which is accomplished by driving the second set of rollers at a faster surface speed than the first set. The result is an even greater molecular orientation to the film in the machine direction which will subsequently become the long dimension of the split film fibers.

The film may be electrostatically charged before or after it has been cooled down. Although various electrostatic charging techniques may be employed to charge the film, two methods have been found to be most preferable. The first method involves passing the film about midway in a gap of about 1.5 to 3 inches between two DC corona electrodes. Corona bars with emitter pins of metallic wire may be used in which one corona electrode has a positive DC voltage potential of about 20 to 30 kV and the opposing electrode has a negative DC voltage of about 20 to 30 kV.

The second, preferred, method utilizes the electrostatic charging technologies described in U.S. Pat. No. 5,401,446 (Tsai and Wadsworth, 1995) incorporated herein by reference, which is referred to as Tantret ™. Technique I and Technique II, which are further described herein. It has been found that Technique II, in which the film is suspended on insulated rollers as the film passes around the inside circumference of two negatively charged metal shells with a positive corona wire of each shell, imparts the highest voltage potentials to the films. Generally, with Technique II, positive 1000 to 3000 volts or more may be imparted to on one side of the films with similar magnitudes of negative volts on the other side of the charged film.

Technique I, wherein films contact a metal roller with a DC voltage of −1 to −10 kV and a wire having a DC voltage of +20 to +40 kV is placed from about 1 to 2 inches above the negatively biased roller with each side of the film being exposed in succession to this roller/wire charging configuration, results in lower voltage potentials as measured on the surfaces of the films. With Technique I, voltages of 300 to 1500 volts on the film surface with generally equal but opposite polarities on each side are typically obtained. The higher surface potentials obtained by Technique II, however, have not been found to result in better measurable filtration efficiencies of the webs made from the split film fibers. Therefore, and because it is easier to lace up and pass the film through the Technique I device, this method is now predominately used to charge the films prior to the splitting process.

The cooled and stretched film may be hot or cold electrostatically charged. The film is then simultaneously stretched and split to narrow widths, typically up to about 50 $\mu$m. The split, flat filaments are then gathered into a tow which is crimped in a controlled numbers of crimps per centimeter and then cut into the desired staple length.

In a particularly preferred embodiment, the dry-laid high dust capacity paper comprises a blend of fluff pulp fibers, bicomponent polymer fibers, and electrostatically charged split film fibers. Preferably, the fluff pulp fibers will be present at about 5–85 wt %, more preferably about 10–70 wt %, and most preferably about 40 wt %, the bicomponent fibers at about 10–60 wt %, more preferably about 10–30 wt % and most preferably about 20 wt %, and the electrostatically charged split film fibers at about 20–80 wt %, and more preferably about 40 wt %. This dry-laid high dust capacity may be thermally bonded, preferably at a temperature of 90–160° C., more preferably at a temperature lower than 110° C., and most preferably at about 90° C.

Other preferred embodiments of the dry-laid capacity paper comprise a thermally bonded paper with 100% "mixed electrostatic fibers", a blend of 20–80% mixed electrostatic fibers and 20–80% B/C fibers, and a blend of 20–80% mixed electrostatic fibers, 10–70% fluff pulp and 10–70% B/C fibers. "Mixed electrostatic fiber" filters are made by blending fibers with widely different triboelectric properties and rubbing them against each other or against the metal parts of machines, such as wires on carding cylinders during carding. This makes one of the types of fibers more positively or negatively charged with respect to the other type of fiber, and enhances the coulombic attraction for dust particles. The production of filters with these types of mixed electrostatic fibers is taught in U.S. Pat. No. 5,470,485 and European Patent Application No. EP 02 246 811 A2, which disclosures are incorporated herein by reference.

In U.S. Pat. No. 5,470,485, the filter material consists of a blend of (I) polyolefin fibers and (II) polyacrylonitrile fibers. The fibers (I) are bicomponent PP/PE fibers of the core/sheath or side-by-side type. The fibers II are "halogen free". The (I) fibers also have some "halogen-substituted polyolefins"; whereas, the acrylonitrile fibers have no halogen. The patent notes that the fibers must be thoroughly washed with nonionic detergent, with alkali, or solvent and then well rinsed before being mixed together so that they do not have any lubricants or antistatic agents. Although the patent teaches that the fiber mat produced should be needlepunched, these fibers could also be cut to lengths of 5–20 mm and mixed with similar length bicomponent thermal binder fibers and also with the possible addition of fluff pulp so that dry-laid thermally bonded paper can be utilized in this invention.

EP 0 246 811 describes the triboelectric effect of rubbing two different types of fibers together. It teaches using similar types of fibers as U.S. Pat. No. 5,470,485, except that the -CN groups of the polyacrylonitrile fibers may be substituted by halogen (preferably fluorine or chlorine). After a sufficient amount of substitution of -CN by -Cl groups, the fiber may be referred to as a "modacrylic" if the copolymer comprises from 35 to 85% weight percent acrylonitrile units. EP 0 246 811 teaches that the ratio of polyolefin to substituted acrylonitrile (preferably modacrylic) may range from 30:70 to 80:20 by surface area, and more preferably from 40:60 to 70:30. Similarly, U.S. Pat. No. 5,470,485 teaches that the ratio of polyolefin to polyacrylonitrile fibers is in the range of 30:70 to 80:20, relative to a surface of the filter material. Thus, these ranges of ratios of polyolefin to acrylic or modacrylic fibers may be used in the above stated proportions in the dry-laid thermally bonded capacity paper.

Meltblown Fleece

A synthetic polymer fiber meltblown fleece can optionally be deployed as an interlayer between the multipurpose layer and the second filtration layer. The meltblown fleece interlayer increases overall filtration efficiency by capturing some particles passed by the multipurpose filtration layer. The meltblown fleece interlayer also optionally can be electrostatically charged to assist in filtering fine dust particles. Inclusion of a meltblown fleece interlayer involves an increase in pressure drop at given dust loading as compared to composites not having a meltblown fleece interlayer.

The meltblown fleece preferably has a basis weight of about 10–50 g/m$^2$ and air permeability of about 100–1500 L/(m$^2 \times$s).

High Bulk Meltblown Nonwoven

Another discovery from this research to develop improved vacuum cleaner bags was the development of a high bulk MB web which could be used as a pre-filter in place of the wet-laid capacity paper or dry-laid capacity. The high bulk MB pre-filter can be made in a meltblowing process using chilled quench air with a temperature of about 10° C. In contrast, conventional MB normally uses room air at an ambient temperature of 35–45° C. Also the collecting distance from the MB die exit to the web take-up conveyor is increased to 400–600 mm in the high bulk MB process. The distance normally is about 200 mm for regular MB production. Additionally, high bulk MB nonwoven is made by using a lower temperature attenuation air temperature about of 215–235° C. instead of the normal attenuation air temperature of 280–290° C., and a lower MB melt temperature of about 200–225° C. compared to 260–280° C. for filtration grade MB production. The colder quench air, lower attenuation air temperature, lower melt temperature and the longer collecting distance cool down the MB filaments more. Removing heat results in less draw down of the filaments, and hence, in larger fiber diameters than would be found in typical filtration grade MB webs. The cooler filaments are much less likely to thermally fuse together when deposited onto the collector. Thus, the high bulk meltblown nonwoven would have more open area. For example, even with a basis weight of 120 g/m$^2$, the air permeability of the high bulk meltblown nonwoven is 806 L/(m$^2$×s). By contrast, a much lighter (e.g., 22 g/m$^2$) filtration grade MB PP web had a maximum air permeability of only 450 L/(m$^2$×s). The filtration efficiency of the high bulk MB nonwoven as determined by the DIN 44956-2 Test was 98%. When the two were put together with the High Bulk MB nonwoven on the inside of the bag, the air permeability was still 295 L/(m$^2$×s), and the filtration efficiency of the pair was 99.8%. The high bulk meltblown nonwoven can be uncharged or optimally electrostatically charged provided that the nonwoven is of material having suitable dielectric properties.

High bulk MB nonwoven of this invention should be distinguished from "filtration grade MB" which also can be employed in the multilayer vacuum filter structure of this disclosure. Filtration grade MB web is a conventional meltblown nonwoven generally characterized by a low basis weight typically of about 22 g/m$^2$, and a small pore size. Additional typical characteristics of filtration grade MB nonwoven of polypropylene are shown in the following table. A preferred high bulk MB nonwoven of polypropylene optionally includes about 5 to 20 wt % ethylene vinyl acetate. Filtration grade MB nonwoven has generally high dust removal efficiency, i.e., greater than about 99%.

|  | Preferred | More Preferred | Most Preferred |
|---|---|---|---|
| Filtration Grade MB PP |  |  |  |
| Weight g/m$^2$ | 5–150 | 10–50 | 22 |
| Thickness, mm | 0.10–2 | 0.10–1.0 | 0.26 |
| Air Permeability, L/(m$^2$ × s) | 100–1500 | 200–800 | 450 |
| Tensile Strength, MD, N | 0.5–15 | 1.0–10 | 3.7 |
| Tensile Strength, CD, N | 0.5–15 | 1.0–10 | 3.2 |
| Fiber Diameter, μm | 1–15 | 1–5 | 2–3 |
| High Bulk MB PP |  |  |  |
| Weight, g/m$^2$ | 30–180 | 60–120 | 80 |
| Thickness, mm | 0.3–3.0 | 0.5–2 | 1.4 |
| Air permeability, L/(m$^2$ × s) | 300–8000 | 600–3000 | 2000 |
| Tensile Strength, MD, N | 1.0–30 | 2–20 | 10 |
| Tensile Strength, CD, N | 1.0–30 | 2–20 | 9.2 |
| Fiber Diameter, μm | 5–20 | 10–15 | 10–12 |

High bulk MB nonwoven is similar in filter efficiency of dry-laid and wet-laid capacity papers mentioned above. Thus, high bulk MB nonwoven is well-adapted to remove large quantities of large dust particles and to hold large amounts of dust. Accordingly, high bulk MB nonwoven is suited for placement upstream as a pre-filter in a multilayer vacuum cleaner bag composite structure.

Spunblown (Modular) Nonwoven

A new type of melt blowing technology described in Ward, G., Nonwovens World, Summer 1998, pp. 37–40, the complete disclosure of which is incorporated herein by reference, is available to produce a Spunblown (Modular) Paper suitable for use vacuum cleaner bag structure. Specifications of the Spunblown (Modular) Paper are presented in the following table.

The process for making the Spunblown (Modular) Paper is generally a meltblown procedure with a more rugged modular die and using colder attenuation air. These conditions produce a coarse meltblown web with higher strength and air permeability at comparable basis weight of conventional meltblown webs.

Microdenier Spunbond Nonwoven

A spunbond ("SB") nonwoven, occasionally referred to herein as microdenier SB, can also be utilized in this invention as the coarse filter layer. Specifications of microdenier SB are listed below. Microdenier SB is particularly characterized by filaments of less than 12 μm diameter which corresponds to 0.10 denier for polypropylene. In comparison, conventional SB webs for disposables typically have filament diameters which average 20 μm. Microdenier SB can be obtained from Reifenhauser GmbH (Reicofil III), Koby Steel, Ltd., (Kobe-Kodoshi Spunbond Technology) and Ason Engineering, Inc. (Ason Spunbond Technology).

|  | Preferred | More Preferred | Most Preferred |
|---|---|---|---|
| Spun Blown Modular |  |  |  |
| Weight g/m² | 20–150 | 20–80 | 40 |
| Thickness, mm | 0.20–2.0 | 0.20–1.5 | 0.79 |
| Air permeability, L/(m² × s) | 200–4000 | 300–3000 | 2000 |
| Tensile Strength, MD, N | 10–60 | 15–40 | — |
| Tensile Strength, CD, N | 10–50 | 12–30 | — |
| Fiber Diameter, (μm) | 0.6–20 | 2–10 | 2–4 |
| Microdenier Spunbond PP (Ason, Kobe-Kodoshi, Reicofil III) |  |  |  |
| Weight, g/m² | 20–150 | 20–80 | 40 |
| Thickness, mm | 0.10–0.6 | 0.15–0.50 | 0.25 |
| Air permeability, L/(m² × s) | 500–10,000 | 2000–6000 | 3000 |
| Tensile Strength, MD, N | 10–100 | 20–80 | 50 |
| Tensile Strength, CD, N | 10–80 | 10–60 | 40 |
| Fiber Diameter, μm | 4–18 | 6–12 | 10 |

Composite Structure

The enhanced performance bag comprises a multipurpose filtration layer positioned upstream of a second filtration layer. The multipurpose filtration layer can be either a dry-laid high dust capacity paper or a wet-laid high dust capacity paper, high bulk meltblown, Spunblown (Modular) or microdenier spunbond. The second filtration layer should be a wet laid filter paper, dry-laid filter paper or a spunbond which may be electrostatically charged, preferably before constructing the bag.

The term "multipurpose filtration layer" is used to denote that the pre-filter layer of dry-laid or wet-laid capacity paper is capable of performing several functions simultaneously. This layer protects the downstream second filtration layer from shock loading by blocking large bursts of dirt particles which can be of size much greater than 10 μm. Additionally, the multipurpose layer filters smaller particles of about 10 mm size. Its porosity and thickness are sufficiently great that this layer has capacity to hold within the layer a large quantity of dirt and dust particles while allowing air flow to permeate the layer at high rate without dramatically increasing pressure drop through the composite structure. Hence, the bag can continue to operate at optimum air flow for vacuum cleaning for times long enough for the bag to reach particle holding capacity. Broadly stated, the multipurpose filtration layer cleans the air of most particles other than fine dust particles which are removed by the second filtration layer.

The term "second filtration layer" denotes a filter layer which is intended to remove from the air passed by the multipurpose layer a sufficient amount of fine dust particles to produce a very high overall filtering efficiency, preferably over 99%. The second filtration layer is less porous than the multipurpose layer. It can have moderate porosity because the multipurpose filtration layer performs the overwhelming majority of the filtration load thereby leaving only the small amount of fine dust size particles to be removed by the high efficiency filter layer. This is particularly the case when the multipurpose filtration layer includes electrostatically charged split film fibers or when an electrostatically charged high bulk meltblown, Spunblown Modular or microdenier spunbond is utilized. In these cases, the upstream layers are effective to remove at least a portion of the fine dust size particles as well as larger particles. This leaves even less fine dust to be removed by the second filtration layer.

The various layers of the enhanced performance bag usually are adhered to adjacent layers at the bag inlets and outlets, and sometimes at the bag seams. They can be unadhered over other portions of the bag structure to adjacent layers or adhered by diverse methods. For example, the layers can be adhered by adhesives, thermal bonding, ultrasonic bonding or a combination of these.

EXAMPLES

Methodology and Test Methods

In the following examples, unless otherwise indicated, basis weight was determined by I.S.O. 536, thickness by DIN 53 105 (0.2 bar), air permeability by DIN 53 887, tensile strength machine direction (MD) and cross machine direction (CD) by DIN 53 112, Mullen's burst pressure (MBP) by DIN 53 141, and filtration properties by T.S.I. 8160 filter tester. In the Figures, air flow direction is shown by arrows.

DIN 44956-2 (April, 1980) test was employed to characterize the performance of vacuum bag filter composites with respect to filtering fine dust particles. The test basically involves filtering a 500 mg sample of SAE fine test dust through a circular 200 square centimeter of filter medium being tested using an air flow of 10 liters per second within a 30 second time period. The pressure drop through the test filter medium is measured before and after filtration. An absolute filter is employed to capture particles which pass the test filter. A coefficient of retention expressed as a percentage is calculated from the quotient of the weight of sample captured by the test filter divided by the total of the test filter-captured sample weight and the weight of sample caught by the absolute filter.

Test for Air Permeability after Fine Dust Loading: The dust loading part of the DIN 44956-2 was performed at 0.5 gram increments from 0 to 12.5 g on seven bags of each sample. However, the pressure drop values were not recorded again. The maximum sustainable air permeability values were then determined on the bags, which had the specified levels of dust loading.

A TSI Model 8110 filter tester was used for the measurement of media filtration efficiency. With the Model 8110 tester 2.0% sodium chloride solution (20 g NaCl in 1 liter of water) was aerosolized by an aerosol generator. The NaCl water drops in aerosol were heated and NaCl crystallites with a 0.1 mm diameter were formed. The mass concentration of NaCl in the air was 101 mg/m³. Photometry was used to detect the volume concentration of the air in the upstream volume of the media (Cu) and the volume concentration of the air in the downstream volume of the media (Cd). The penetration ability of the NaCl particles was calculated as:

$$\text{Penetration} = P = [Cd/CU] \, (100\%)$$

Comparative Example 1

FIG. 1 shows a cross section of a commercially available vacuum cleaner bag structure 51 consisting of a wet-laid tissue fleece liner 52 on the inside (upstream air side) of the bag and a standard wet-laid filter paper 53 on the outside (downstream air side) of the bag. Properties of the individual layers and composite structure are presented in Table I. The liner primarily protects the wet-laid filter paper from abrasion, but also pre-filters out some of the largest particles. The wet-laid filter paper typically filters out particles greater than about 10 μm and some smaller particles.

Comparative Example 2

Figure 2:
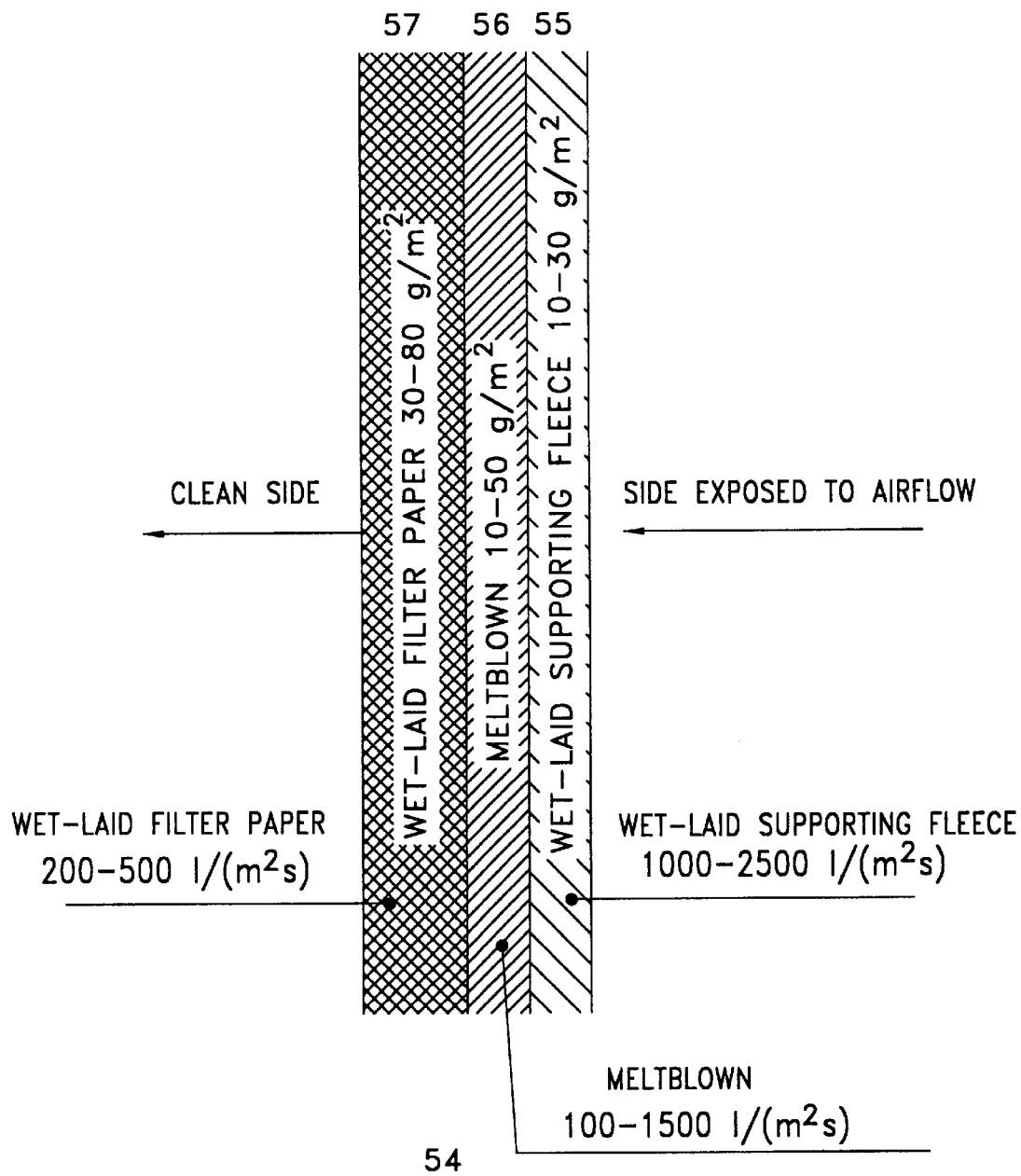
FIG. 2 is a schematic cross section of another vacuum cleaner bag construction.

FIG. 2 shows a cross section of a conventional three-layer vacuum cleaner bag structure 54 in which a wet-laid tissue supporting fleece 55 with very little dust holding capacity is added upstream of a MB fleece 56 to protect from abrasion and a wet-laid filter paper 57 is placed on the outside (downstream) to protect the bag from abrasion, to improve stiffness for bag fabrication and to provide additional air filtration. Properties of the individual layers and composite structure are presented in Table I.

Examples 1–3

Figure 3:
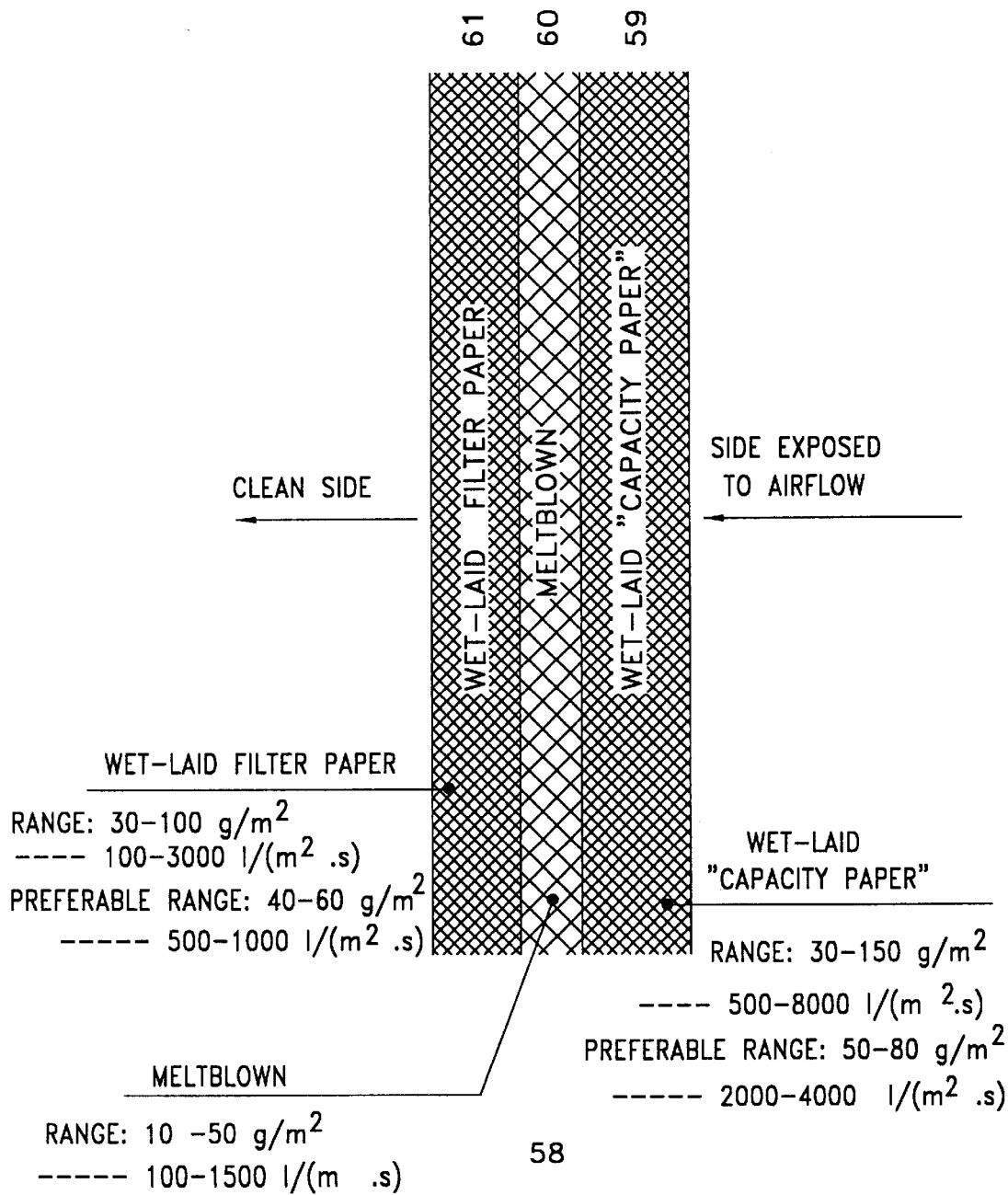
FIG. 3 is a schematic cross section of an embodiment of an enhanced performance bag structure having a melt blown interlayer according to this invention.

FIG. 3 depicts a novel three-layer vacuum cleaner bag composite structure 58 of Example 1 with a wet-laid high dust capacity paper layer 59 on the inside (upstream air side) in front of a melt blown filter layer 60. A highly air permeable wet-laid filter paper layer 61 is on the outside (downstream air side).

Figure 4:
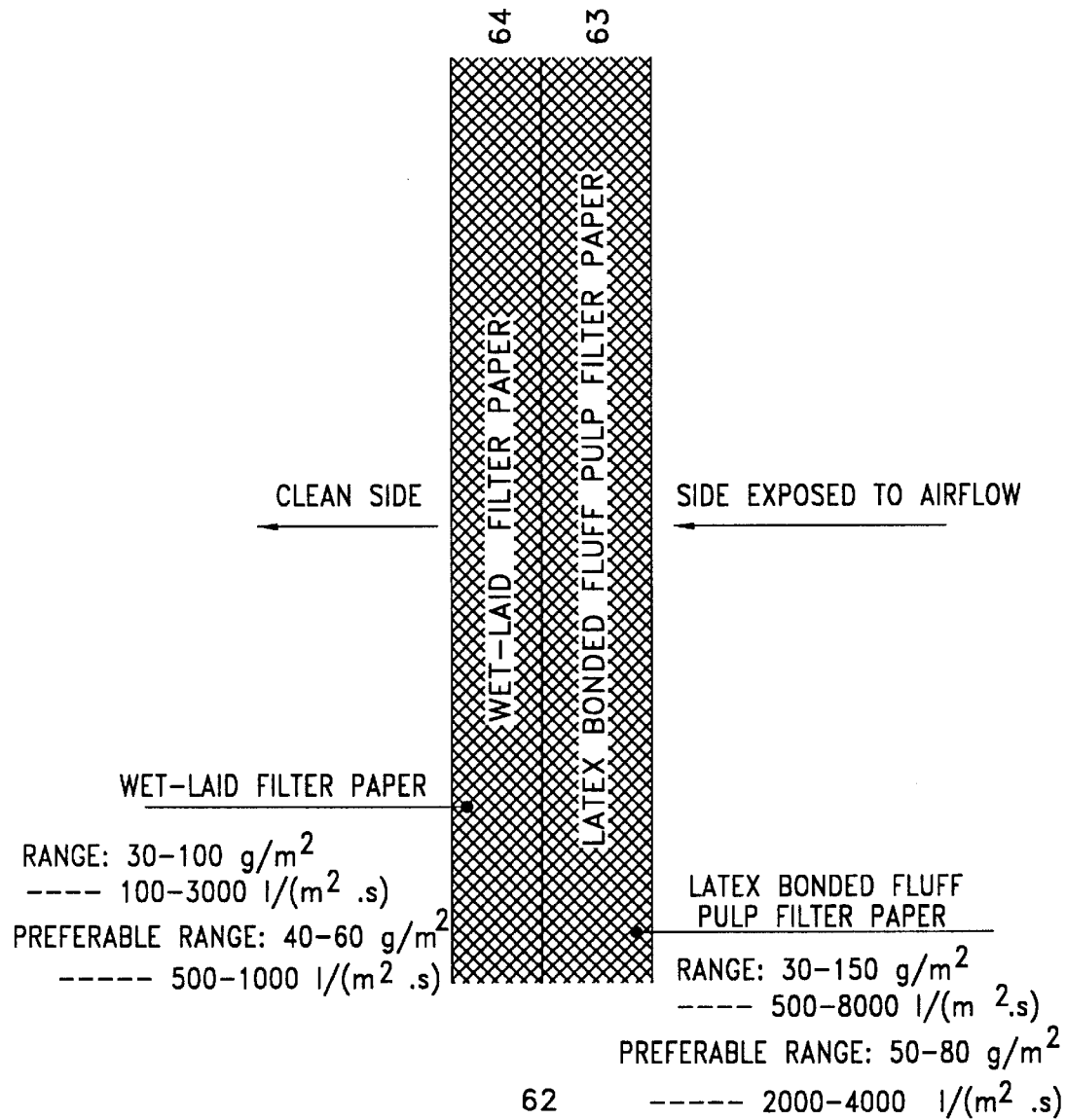
FIG. 4 is a schematic cross section of another embodiment of an enhanced performance bag structure having a latex bonded fluff pulp fiber dry-laid high dust capacity multipurpose layer upstream of a wet-laid paper second filtration layer according to this invention.

FIG. 4 depicts a novel inventive vacuum cleaner bag composite structure 62 of Example 2 in which a dry-laid high dust capacity paper 63 consisting of 100% fluff pulp fibers held together by 20 weight % latex binder is positioned as the inside layer and a conventional wet-laid filter paper 64 is the outside layer.

Figure 5:
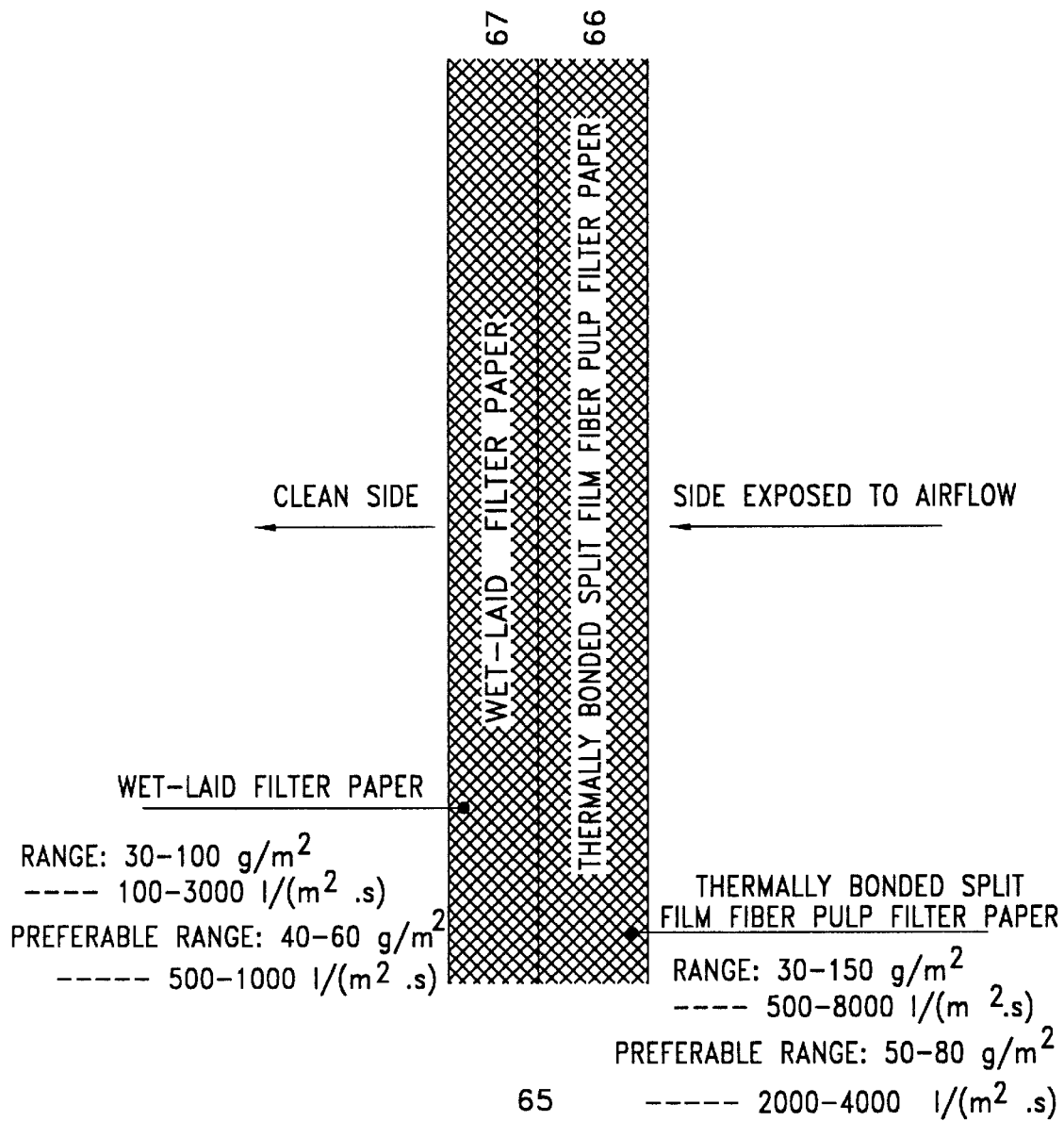
FIG. 5 is a schematic cross section of another embodiment of an enhanced performance bag structure having a thermally bonded, dry-laid high dust capacity multipurpose layer upstream of a wet-laid paper second filtration layer according to this invention.

FIG. 5 depicts a novel vacuum cleaner bag construction 65 of Example 3 consisting of a thermally bonded, dry-laid high dust capacity paper 66 in the upstream air position inside the bag with a highly permeable wet-laid filter paper 67 on the outside of the bag. The fiber content of the dry-laid high dust capacity paper 66 consists of a blend of 40% fluff pulp fibers, 40% split film fibers and 20% bicomponent polymer fibers. Properties of the individual layers and composite structures are presented in Table I which compares filtration properties of various composite structures at 100 L/min. flow. Data in Table I shows that Examples 1 and 3 structures produced dramatically increased filtration efficiency relative to Comp. Ex. 1 with only slight pressure drop increase. Also, Example 1 produced slightly better filtration efficiency at the same pressure drop as Comp. Ex. 2. Example 2 compared well with commercially available Comp. Ex. 1 structure.

Figure 6:
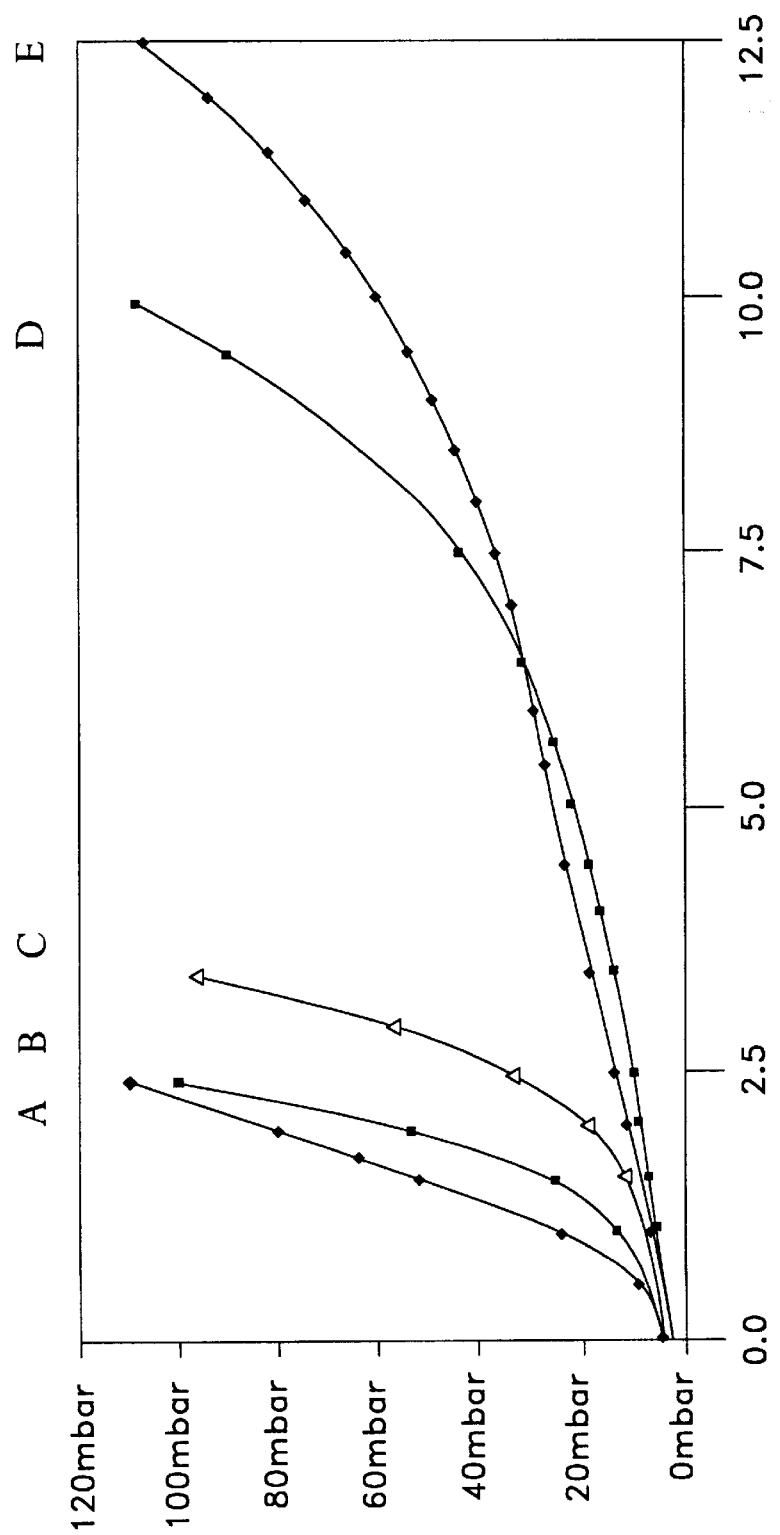
FIG. 6 is a plot of pressure drop across selected vacuum cleaner bag structures versus fine dust loading.

Each of the above-described example structures was tested for fine dust loading and the results are presented in Table II. FIG. 6 is a plot of the pressure drop across the bag structures versus grams of fine dust loading in which curves A-E represent Comparative Examples 1 and 2, (A and B) and Examples 1–3 (C, D and E), respectively. The plot shows that conventional bag structures attained high pressure drops rapidly with very low loadings (i.e., about 100 mbar at less than 2.5 g). Example 1 arrived at equivalent high pressure drop after 3.5 g dust loading, which is approximately 40% improvement. Examples 2 and 3 produced remarkably superior fine dust loading results by reaching about 100 mbar pressure drop at about 10 g and 12.5 g. loading and with pressure drop not exceeding about 30 mbar at fine dust loading of 6.5 g and about 40 mbar until after about 7.5 g. These results demonstrate about 300–400% improvement over conventional filter constructions. Notably, Examples 2 and 3 do not include MB filter interlayer between the upstream high dust capacity mutipurpose layer and the downstream second filtration layer.

Figure 7K:
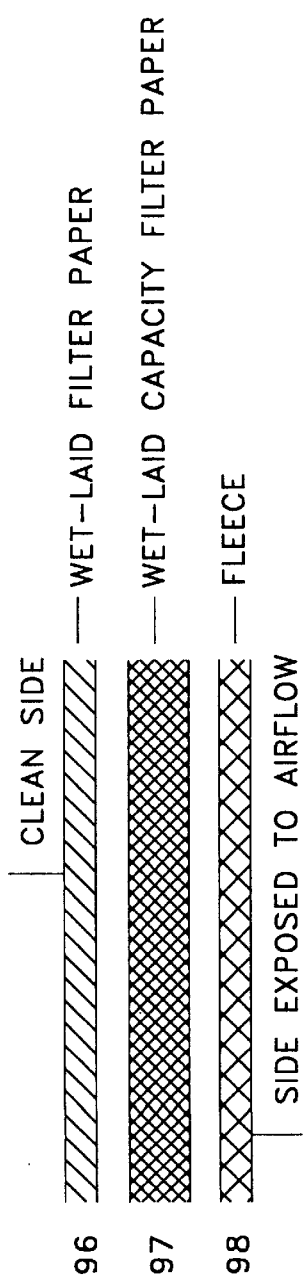
FIGS. 7A–7P are schematic cross sections of selected embodiments of enhanced performance bag structures of this invention in which wet-laid paper layer is the most downstream layer.
Figure 7L:
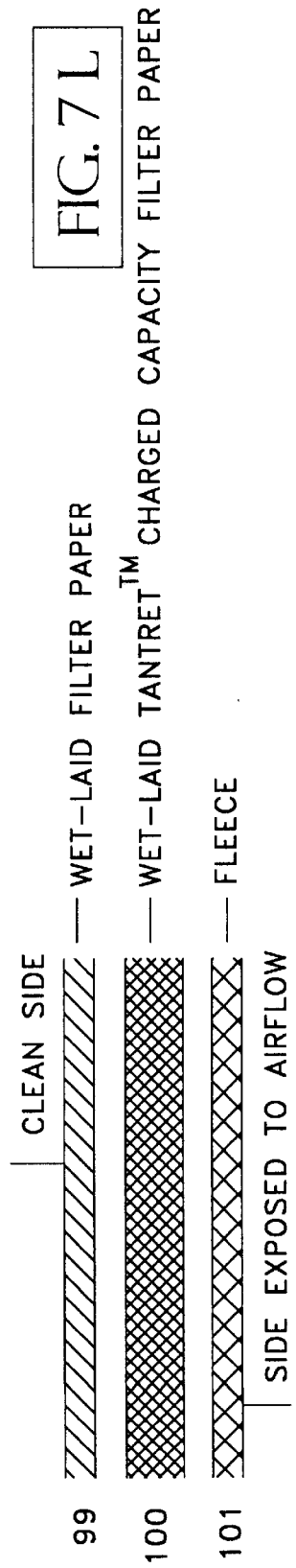
Figure 7M:
Figure 7N:
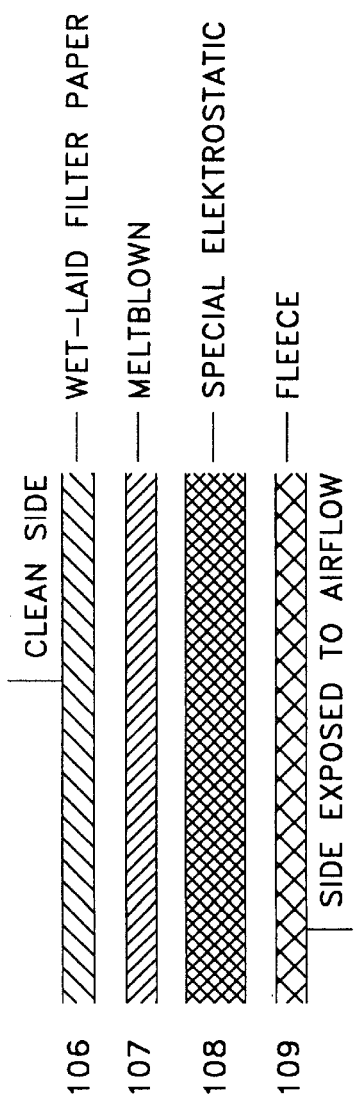
Figure 7O:
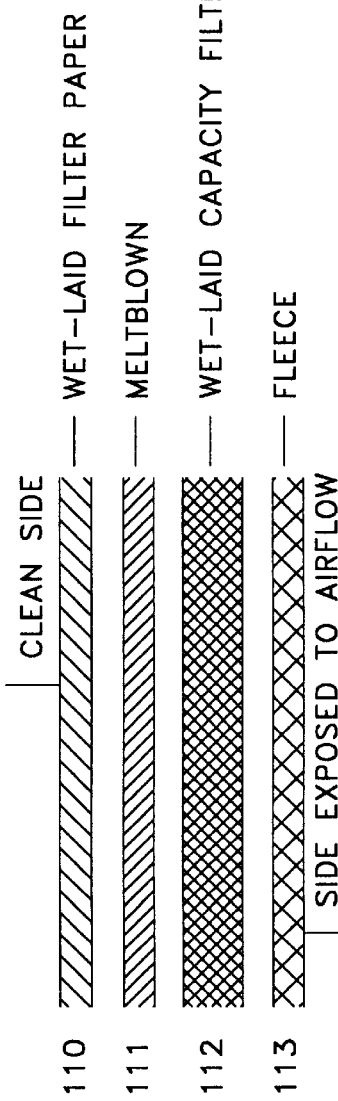
Figure 7P:
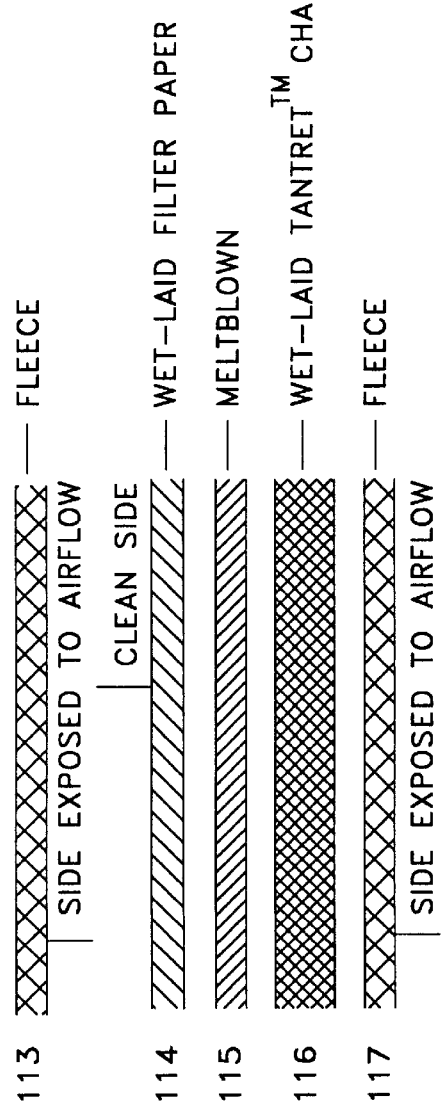
Figure 8:
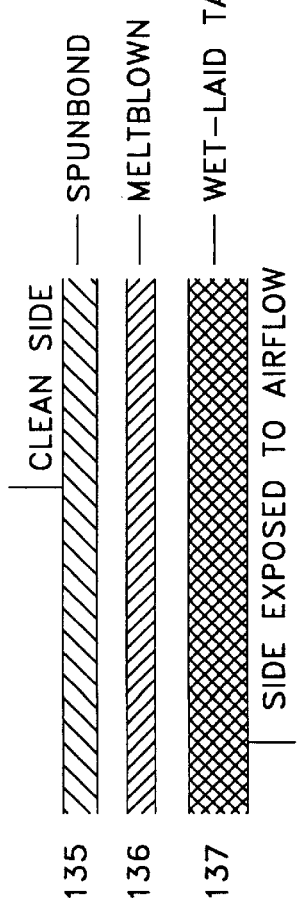
FIGS. 8Q–8AF are schematic cross sections of selected embodiments of enhanced performance bag structures of this invention in which a spunbond fleece layer is the most downstream layer.
Figure 8:
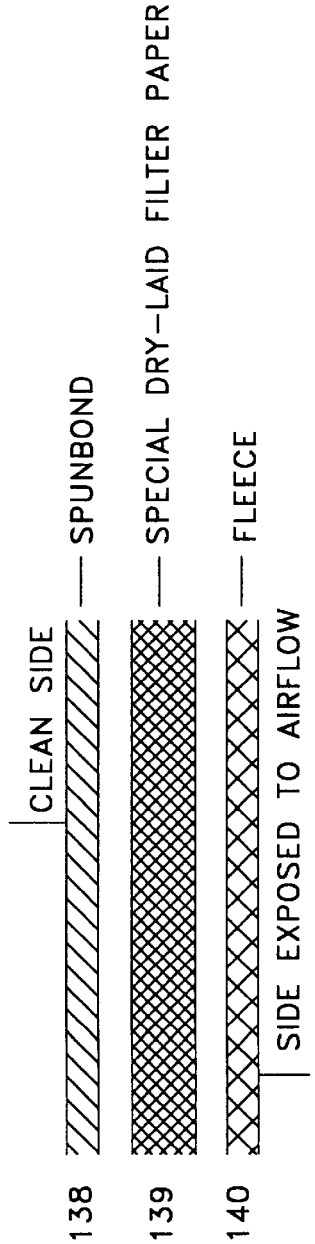
Figure 8:
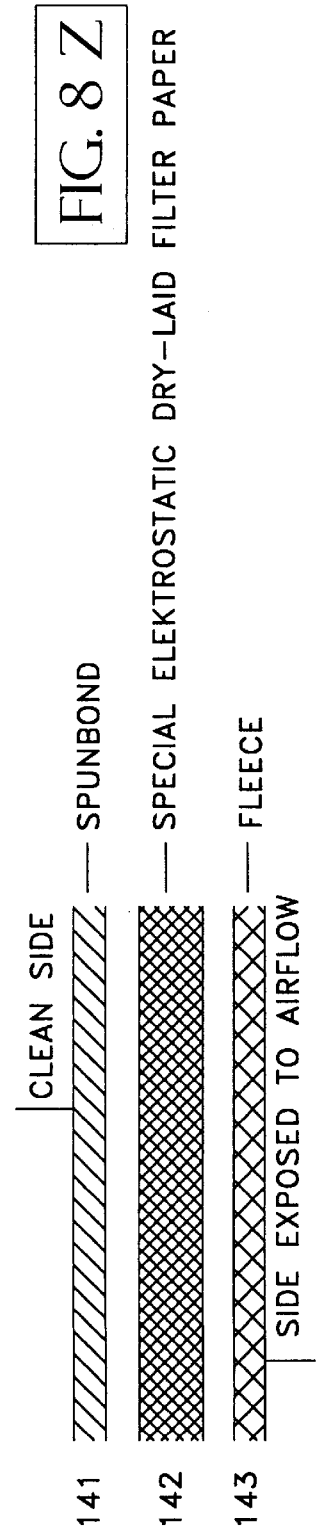

Additional examples of enhanced performance vacuum cleaner bag composite structures contemplated to fall within the definition of the present invention as illustrated in FIGS. 7–9. In particular, FIG. 7A shows a two-layer structure in which the upstream, multipurpose layer is a dry-laid filter composition of exclusively fluff pulp fibers held together with a dried latex binder, or of a blend of bicomponent polymer fibers and fluff pulp fibers which are thermally bonded. The multipurpose layer has high air permeability and dust holding capacity.

FIG. 7B also shows a two-layer structure in which the multipurpose layer is a three component blend of fluff pulp fibers, bicomponent polymer fibers and electrostatically charged split film fibers. Again, the blend is held together by thermal bonding, primarily of the low-melting bicomponent polymer fiber composition.

FIG. 7C shows another two-layer structure with specially developed, high dust holding capacity wet-laid filter paper in the upstream position. The fibers in the wet laid paper are a blend of synthetic fibers and natural, i.e., wood pulp, fibers. Preferably, the synthetic fibers are polyester, and more preferably, polyethylene terephthalate. The fibers are bonded by a latex binder at about 10–30 wt % dry binder solids based on fiber weight.

FIG. 7D illustrates a two-layer structure in which the upstream, multipurpose layer comprises polyolefin, and preferably polypropylene fibers. This layer is electrostatically charged. Preferably, the Tantret(™) technology.

FIGS. 7E–7H show structures which are the same as those of FIGS. 7A–7D, respectively, except that an optional, meltblown fleece interlayer is inserted between the multipurpose filter layer and the second filtration layer.

FIGS. 7I–7P show structures which correspond to FIGS. 7A–7H, respectively, except that an optional fleece scrim has been added to the side of the vacuum filter bag exposed to the airflow to protect the next layer from abrasion and to filter some of the very large dust particles.

FIGS. 8Q–8AF show structures which correspond to FIGS. 7A–7P, respectively, except that an optional spunbond fleece is placed in the most downstream layer position and hence is on the outside of the vacuum cleaner bag.

Figure 9A:
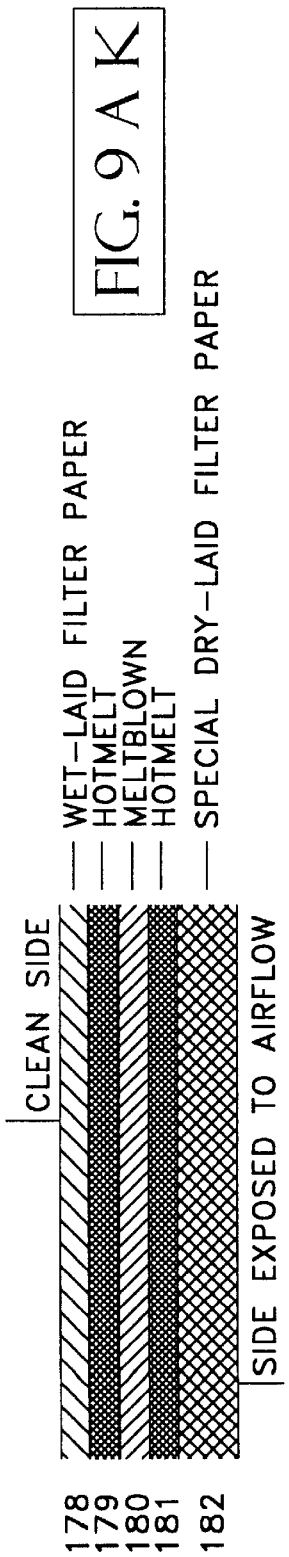
FIGS. 9AG–9BL are schematic cross sections of selected embodiments of enhanced performance bag structures of this invention in which adjacent layers are bonded by a hot melt adhesive.
Figure 9A:
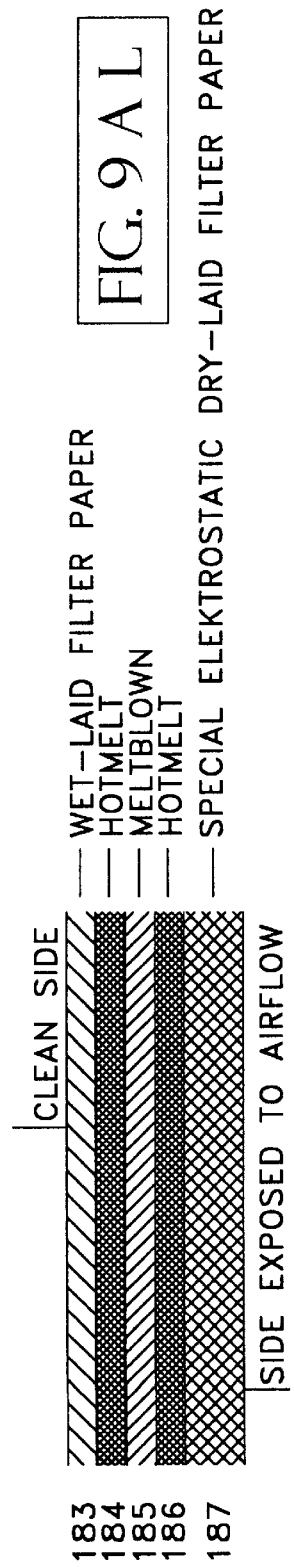
Figure 9A:
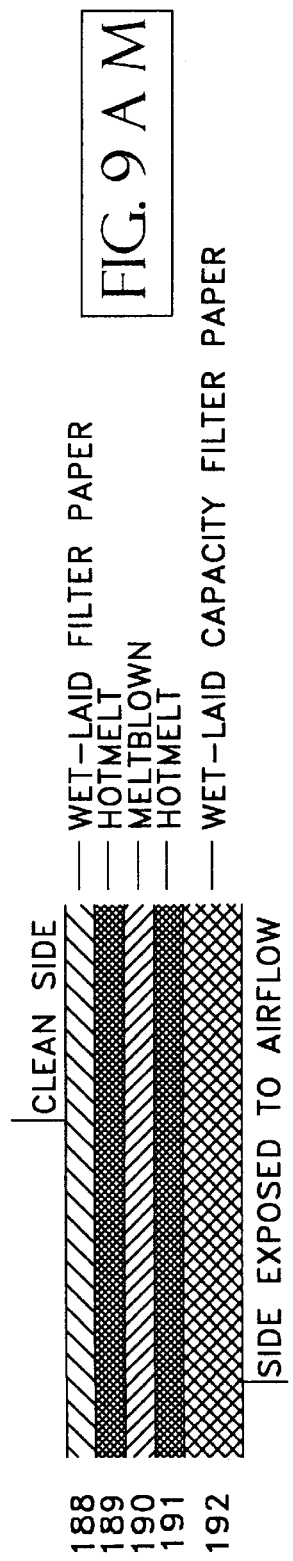
Figure 9B:
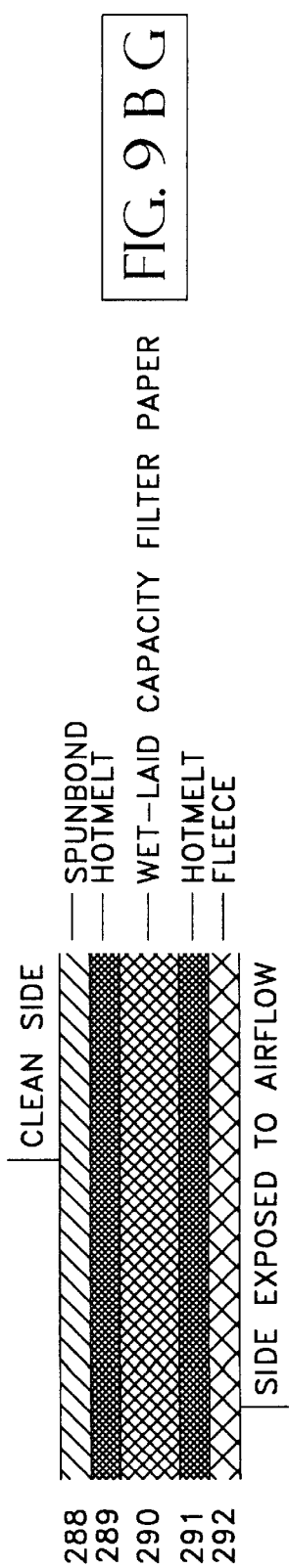
Figure 9B:
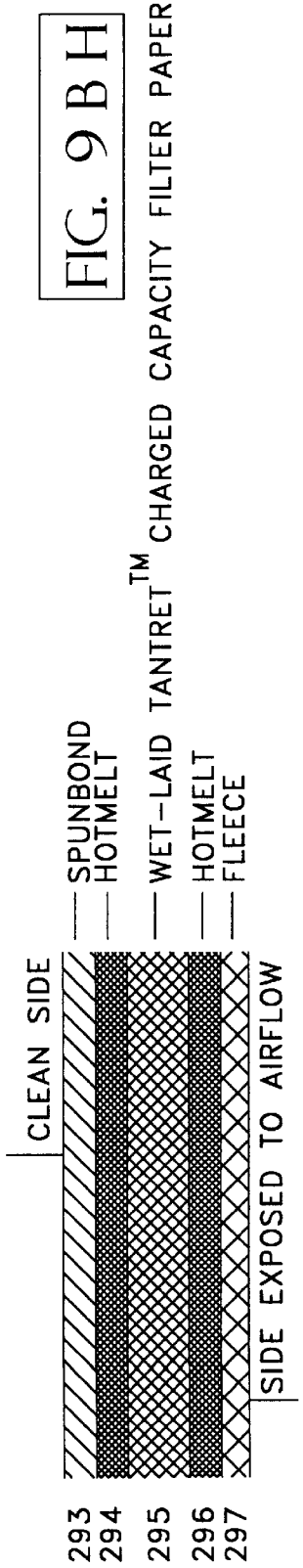
Figure 9B:
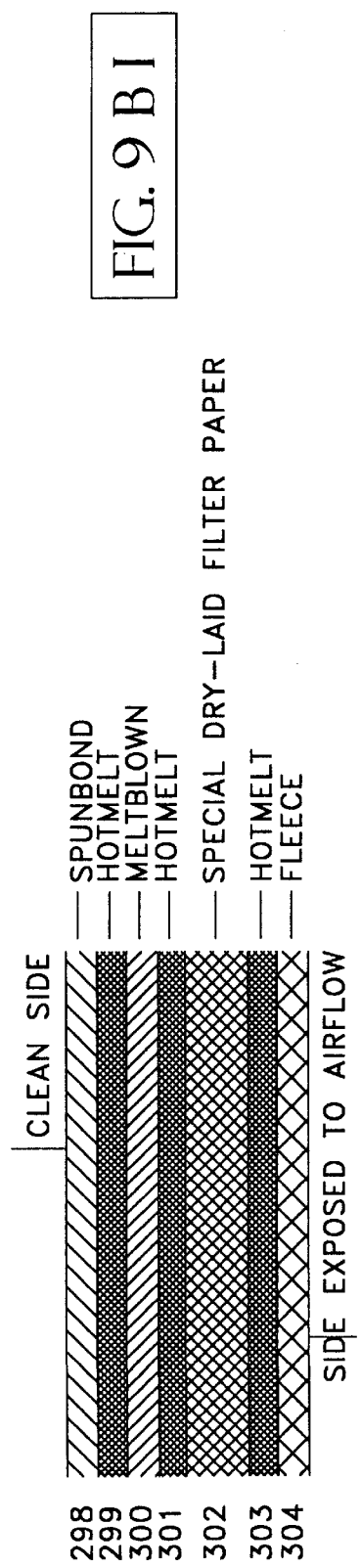
Figure 9B:
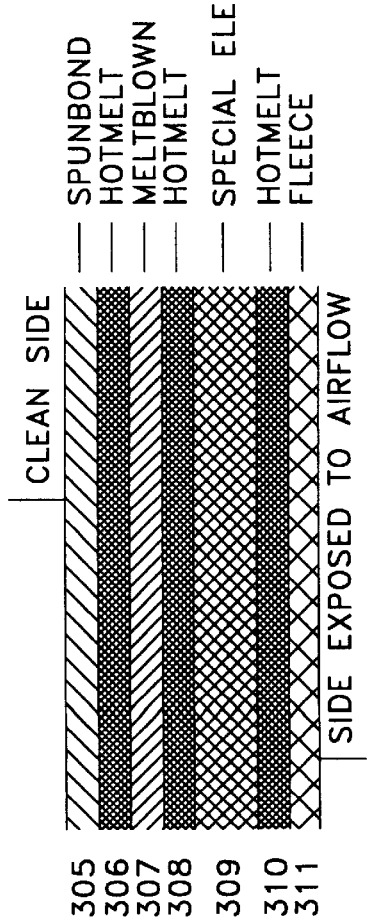
Figure 9B:
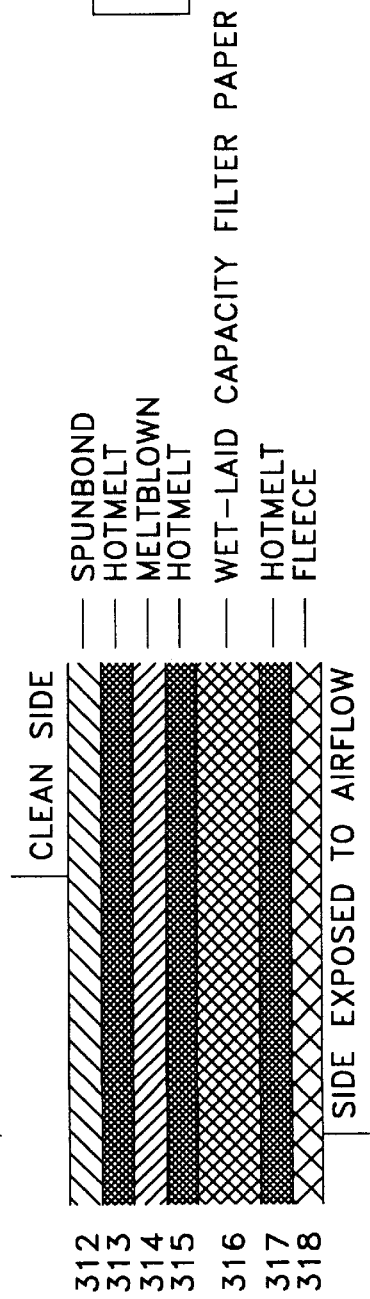
Figure 9B:
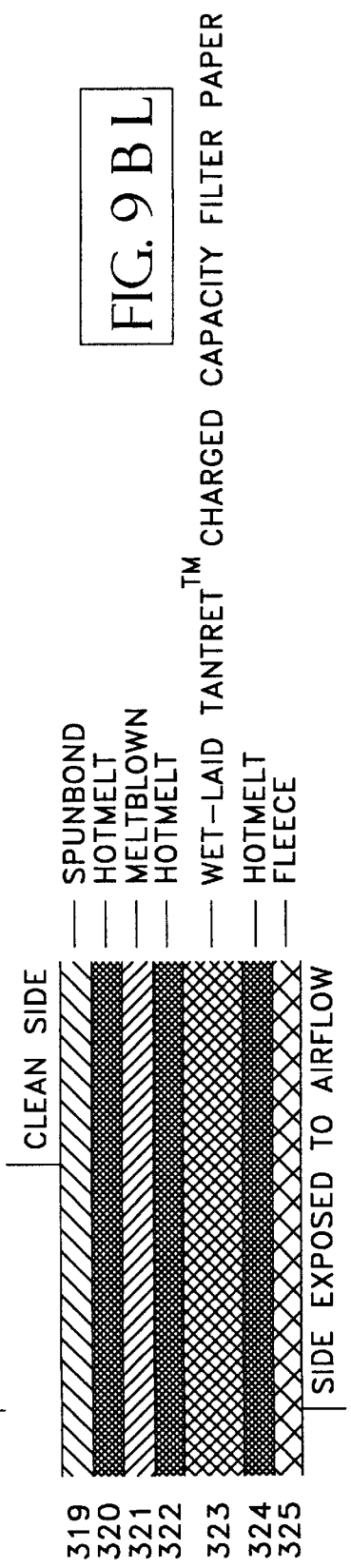

FIGS. 9AG–9BL show structures which correspond to FIGS. 7A–8AF, respectively, except that adjacent layers of the composite are bonded by a hot melt adhesive. The hot melt may also be replaced or used in conjunction with all known methods of laminating, including glues and thermal and ultrasonic bonding. Although the figures only illustrate embodiments in which an adhesive is present between all adjacent layers, it is contemplated that all layers need not be joined in this way, i.e., some layers of the composite will be bonded with adhesive and others will not.

All publications, including patents referred to herein are incorporated herein by reference.

While the invention has been fully and amply described for one of average skill in the pertinent art, it should be understood that various substitutions and modifications which bring about substantially equivalent or superior results and/or performance are within the scope and the spirit of the following claims.

TABLE I

| Example | | Comp. Ex. 1 | | | Comp. Ex. 2 | | | Ex. 1 | | |
|---|---|---|---|---|---|---|---|---|---|---|
| Layer/Composite | | 51 | 52 | 53 | 54 | 55 | 56 | 57 | 58 | 59 |
| Basis Weight | g/m² | 58 | 13 | 45 | 80 | 13 | 22 | 45 | | 50 |
| Thickness | mm | 0.25 | 0.05 | 0.2 | 0.51 | 0.05 | 0.26 | 0.2 | | 0.32 |
| Air Permeability | L/(m²*s) | 330 | 2100 | 400 | 225 | 2100 | 480 | 400 | | 2900 |
| Tensile Strength MD | N | | >6.0 | 37 | | >6.0 | 2.8 | 37 | | 16 |
| Tensile Strength CD | N | | >1.5 | 20 | | >1.5 | 2.9 | 20 | | 7 |
| Pore Diameter | μm | | — | 11.91 | | 16.52 | | 11.91 | | — |
| | | | | 64 | | >300 | | 64 | | |
| | MFP | | | 23.43 | | 39.57 | | 23.43 | | |
| MBP | bar | | 0.3 | 1.2 | | 0.3 | 0.5 | 1.2 | | 0.7 |
| FILTRATION PROPERTIES | | | | | | | | | | |
| Flow | L/min. | 100.0 | | | 100 | | | 100 | | |
| Layer/Composite | | 60 | 61 | 62 | 63 | 64 | 65 | 66 | 67 | |
| Basis Weight | g/m₂ | 22 | 45 | | 77 | 45 | | | 45 | |
| Thickness | mm | 0.26 | 0.2 | | 0.94 | 0.2 | | | 0.2 | |
| Air Permeability | L/(m²*s) | 480 | 400 | | 1850 | 400 | | | 400 | A |
| Tensile Strength MD | N | 2.8 | 20 | | 6.1 | 37 | | | 37 | |
| Tensile Strength CD | N | 2.9 | 20 | | 5.4 | 20 | | | 20 | |
| Pore Diameter | μm | | 11.91 | | | 11.91 | | | 11.91 | |
| | | | 64 | | | 64 | | | 64 | |
| | MFP | | 23.43 | | | 23.43 | | | 23.43 | |
| MBP | bar | 0.5 | 1.2 | | | 1.2 | | | 1.2 | |
| FILTRATION PROPERTIES | | | | | | | | | | |
| Flow | L/min. | | | | 100 | | | 100 | | |

TABLE II

| | Comp. Ex. 1 | Comp. Ex. 2 | Ex. 1 | Ex. 2 | Ex. 3 |
|---|---|---|---|---|---|
| Efficiency (%) | 96.0 | 99.6 | 99.6 | 99.7 | 99.8 |
| Air Flow @ 2 mbar (L) | 7.00 | 4.15 | 4.4 | 5.9 | 6.4 |
| Dust Loading (g) | | Pressure Drop (mbar) 10 Litre | | | |
| 0 | 3.21 | 5.14 | 4.86 | 3.44 | 3.20 |
| 0.5 | 8.90 | 7.70 | 6.02 | 4.05 | 4.48 |
| 1.0 | 24.19 | 13.37 | 7.87 | 5.79 | 6.25 |
| 1.5 | 51.64 | 25.87 | 11.80 | 7.20 | 8.45 |
| 2.0 | 79.58 | 53.06 | 19.03 | 8.61 | 11.30 |
| 2.5 | 110.00 | 100.32 | 33.22 | 10.14 | 13.70 |
| 3.0 | | | 96.30 | 11.98 | 16.16 |
| 3.5 | | | | 13.87 | 18.33 |
| 4.0 | | | | 16.07 | 20.62 |
| 4.5 | | | | 18.26 | 22.62 |
| 5.0 | | | | 20.81 | 24.61 |
| 5.5 | | | | 23.46 | 26.83 |
| 6.0 | | | | 27.23 | 29.19 |
| 6.5 | | | | 31.21 | 31.09 |
| 7.0 | | | | 35.68 | 32.99 |
| 7.5 | | | | 42.74 | 36.00 |
| 8.0 | | | | 50.70 | 39.60 |
| 8.5 | | | | 62.02 | 43.95 |
| 9.0 | | | | 74.20 | 48.20 |
| 9.5 | | | | 89.20 | 53.20 |
| 10.0 | | | | 106.36 | 58.68 |
| 10.5 | | | | | 65.57 |
| 11.0 | | | | | 73.80 |
| 11.5 | | | | | 81.75 |
| 12.0 | | | | | 93.04 |
| 12.5 | | | | | 106.11 |

What is claimed is:

1. A composite structure for a disposable vacuum cleaner bag comprising a multipurpose filtration capacity layer positioned upstream in the direction of air flow of a second filtration layer, the second filtration layer being selected from among (a) a wet-laid or a dry-laid filter having a base weight of about 30–100 g/m2 and air permeability of about 100–3000 L/(m2xs) and (b) thermally bonded nonwoven having a basis weight of about 10–100 g/m2 and a permeability of about 100–3000 L/(m2xs).

2. The composite structure of claim 1 in which the multipurpose filtration capacity layer is selected from among:
    (a) a wet-laid or a dry-laid high dust capacity paper having a basis weight of about 30–150 g/m2 and air permeability of about 500–8000 L/(m2xs);
    (b) high bulk meltblown nonwoven having a basis weight of about 30–180 g/m2 and an air permeability of about 300–1500 L/(m2xs);
    (c) Spunblown Modular paper having a basis weight of about 20–150 g/m2 and an air permeability of about 200–3000 L/(m2xs); and
    (d) microdiener spunbond nonwoven having a basis weight of about 20–150 g/m2 and an air permeability of about 500–10,000 L/(m2xs).

3. The composite structure of claim 1 in which the multipurpose filtration layer is operative to provide to the composite structure a pressure drop of at most 30 mbar at fine dust particle loading of at least 6.5 grams determined by DIN 44956-2.

4. The composite structure of claim 2 in which the wet-laid high dust capacity paper comprises fibers comprising at least 15% chargeable or unchargeable synthetic fiber and a complementary amount of wood pulp fibers, and binder.

5. The composite structure of claim 4 in which the synthetic fibers are polyester.

6. The composite structure of claim 4 in which the synthetic fibers are polyolefin fibers.

7. The composite structure of claim 6 in which the polyolefin fibers are electrostatically charged polypropylene.

8. The composite structure of claim 1 in which the multipurpose filtration layer comprises a dry-laid, high dust capacity paper of composition selected from among (a) latex bonded fluff pulp fibers, (b) thermally bondable fusing fibers, (c) a thermally bonded blend of thermally bondable fusing polymer fibers and fluff pulp fibers, (d) a thermally bonded blend of thermally bondable fusing fibers, fluff pulp fibers and split film fibers, (e) thermally bonded blend of mixed electrostatic fibers.

9. The composite structure of claim 8 in which thermally bondable fusing fibers are bicomponent polymer fibers.

10. The composite structure of claim 9 in which the bicomponent polymer fibers are polyolefin.

11. The composite structure of claim 10 in which the bicomponent polymer fibers have a core of polypropylene and a sheath of polyethylene.

12. The composite structure of claim 9 in which the bicomponent polymer fibers have a core disposed eccentrically relative to a sheath.

13. The composite structure of claim 12 in which the core is positioned alongside the sheath.

14. The composite structure of claim 8 in which the split film fibers are electrostatically charged.

15. The composite structure of claim 1 further comprising a meltblown fleece layer having a basis weight of about 10–50 g/m2 and an air permeability of about 100–1500 L/(m2×s) positioned between the multipurpose filtration layer and the second filtration layer.

16. The composite structure of claim 15 in which the meltblown fleece layer is electrostatically charged.

17. The composite structure of claim 1 in which the thermally bonded nonwoven is the most downstream layer of the structure.

18. The composite structure of claim 1 in which at least two adjacent layers of the structure are bonded.

19. The composite structure of claim 18 in which the two bonded adjacent layers are the multipurpose filtration layer and the second filtration layer.

20. The composite structure of claim 18 in which all adjacent layers of the structure are bonded.

21. The bag of claim 1, in which the high bulk meltblown nonwoven is electrostatically charged.

22. The composite structure of claim 1 in which at least one of the layers is of a chargeable material and the chargeable layer is electrostatically charged.

23. A filter for removing particles entrained in a gas comprising a multipurpose filtration capacity layer positioned upstream in the direction of air flow of a second filtration layer, the second filtration layer being selected from among (a) a wet-laid or a dry-laid filter having a base weight of about 30–100 g/m2 and air permeability of about 100–3000 L/(m2×s) and (b) thermally bonded nonwoven having a basis weight of about 10–100 g/m2 and a permeability of about 100–3000 L/(m2×s).

24. The filter of claim 23 in which the multipurpose filtration capacity layer is selected from among:
   (a) a wet-laid or a dry-laid high dust capacity paper having a basis weight of about 30–150 g/m2 and air permeability of about 500–8000 L/(m2×s);
   (b) high bulk meltblown nonwoven having a basis weight of about 30–180 g/m2 and an air permeability of about 300–1500 L/(m2×s);
   (c) Spunblown Modular paper having a basis weight of about 20–150 g/m2 and an air permeability of about 200–3000 L/(m2×s); and
   (d) microdiener spunbond nonwoven having a basis weight of about 20–150 g/m2 and an air permeability of about 500–10,000 L/(m2×s).

25. A method of filtering a gas comprising passing a gas entrained with particles through a composite structure comprising a multipurpose filtration capacity layer positioned upstream in the direction of air flow of a second filtration layer, the second filtration layer being selected from among (a) a wet-laid or a dry-laid filter having a base weight of about 30–100 g/m2 and air permeability of about 100–3000 L/(m2×s) and (b) thermally bonded nonwoven having a basis weight of about 10–100 g/m2 and a permeability of about 100–3000 L/(m2×s).

26. The method of claim 25 in which the multipurpose filtration capacity layer is selected from among:
   (a) a wet-laid or a dry-laid high dust capacity paper having a basis weight of about 30–150 g/m2 and air permeability of about 500–8000 L/(m2×s);
   (b) high bulk meltblown nonwoven having a basis weight of about 30–180 g/m2 and an air permeability of about 300–1500 L/(m2×s);
   (c) Spunblown Modular paper having a basis weight of about 20–150 g/m2 and an air permeability of about 200–3000 L/(m2×s); and
   (d) microdiener spunbond nonwoven having a basis weight of about 20–150 g/m2 and an air permeability of about 500–10,000 L/(m2×s).

* * * * *